United States Patent
Svendsen

(10) Patent No.: US 9,015,109 B2
(45) Date of Patent: Apr. 21, 2015

(54) SYSTEMS, METHODS, AND COMPUTER READABLE MEDIA FOR MAINTAINING RECOMMENDATIONS IN A MEDIA RECOMMENDATION SYSTEM

(71) Applicant: Lemi Technology, LLC, Wilmington, DE (US)

(72) Inventor: Hugh Blake Svendsen, Chapel Hill, NC (US)

(73) Assignee: Lemi Technology, LLC, Wilmington, DE (US)

(*) Notice: Subject to any disclaimer, the term of this patent is extended or adjusted under 35 U.S.C. 154(b) by 0 days.

(21) Appl. No.: 13/666,825

(22) Filed: Nov. 1, 2012

(65) Prior Publication Data

US 2013/0110772 A1 May 2, 2013

Related U.S. Application Data

(60) Provisional application No. 61/554,102, filed on Nov. 1, 2011.

(51) Int. Cl.
*G06F 17/30* (2006.01)

(52) U.S. Cl.
CPC ............... *G06F 17/30029* (2013.01)

(58) Field of Classification Search
None
See application file for complete search history.

(56) References Cited

U.S. PATENT DOCUMENTS

| | | |
|---|---|---|
| 4,870,579 A | 9/1989 | Hey |
| 5,229,893 A | 7/1993 | Dworatzek et al. |
| 5,598,352 A | 1/1997 | Rosenau et al. |
| 5,621,456 A | 4/1997 | Florin et al. |
| 5,717,869 A | 2/1998 | Moran et al. |
| 5,724,567 A | 3/1998 | Rose et al. |
| 5,786,814 A | 7/1998 | Moran et al. |
| 5,815,634 A | 9/1998 | Daum et al. |
| 5,956,027 A | 9/1999 | Krishnamurthy |
| 5,960,437 A | 9/1999 | Krawchuk et al. |

(Continued)

FOREIGN PATENT DOCUMENTS

| | | |
|---|---|---|
| CN | 1208930 | 2/1999 |
| CN | 1586080 | 2/2005 |

(Continued)

OTHER PUBLICATIONS

Gopalan et al., "A Context Aware Personalized Media Recommendation System: An Adaptive Evolutionary Algorithm Approach," 2011 Sixth International Conference on Bio-Inspired Computing: Theories and Applications (BIC-TA), Sep. 27-29, 2011, USM, Penang, Malaysia, pp. 45-50.

(Continued)

*Primary Examiner* — Robert Beausoliel, Jr.
*Assistant Examiner* — Hau H Hoang

(57) ABSTRACT

Methods and systems for generating media item recommendations are disclosed herein. According to an aspect, a method may include using at least a processor and memory for receiving candidate media items associated with one or more computing devices that either has recently played or is currently playing a media item currently being played by another computing device. The method may also include determining recommendation scores for the candidate media items based on occurrence counts of the media items within a predetermined time period. Further, the method may include generating a media item recommendation for the other computing device based on the recommendation scores.

21 Claims, 26 Drawing Sheets

(56) References Cited

U.S. PATENT DOCUMENTS

| | | |
|---|---|---|
| 5,963,916 A | 10/1999 | Kaplan |
| 6,177,928 B1 | 1/2001 | Basso et al. |
| 6,195,657 B1 | 2/2001 | Rucker et al. |
| 6,266,649 B1 | 7/2001 | Linden et al. |
| 6,317,722 B1 | 11/2001 | Jacobi et al. |
| 6,353,823 B1 | 3/2002 | Kumar |
| 6,388,714 B1 | 5/2002 | Schein et al. |
| 6,438,759 B1 | 8/2002 | Jaunault et al. |
| 6,448,978 B1 | 9/2002 | Salvador et al. |
| 6,505,348 B1 | 1/2003 | Knowles et al. |
| 6,507,727 B1 | 1/2003 | Henrick |
| 6,526,411 B1 | 2/2003 | Ward |
| 6,567,797 B1 | 5/2003 | Schuetze et al. |
| 6,587,127 B1 | 7/2003 | Leeke et al. |
| 6,587,850 B2 | 7/2003 | Zhai |
| 6,609,253 B1 | 8/2003 | Swix et al. |
| 6,615,208 B1 | 9/2003 | Behrens et al. |
| 6,654,786 B1 | 11/2003 | Fox et al. |
| 6,662,231 B1 | 12/2003 | Drosset et al. |
| 6,694,482 B1 | 2/2004 | Arellano et al. |
| 6,748,395 B1 | 6/2004 | Picker et al. |
| 6,754,904 B1 | 6/2004 | Cooper et al. |
| 6,795,808 B1 | 9/2004 | Strubbe et al. |
| 6,834,195 B2 | 12/2004 | Brandenberg et al. |
| 6,850,256 B2 | 2/2005 | Crow et al. |
| 6,865,565 B2 | 3/2005 | Rainsberger et al. |
| 6,865,600 B1 | 3/2005 | Brydon et al. |
| 6,888,457 B2 | 5/2005 | Wilkinson et al. |
| 6,934,461 B1 | 8/2005 | Strub et al. |
| 6,941,275 B1 | 9/2005 | Swierczek |
| 6,959,338 B2 | 10/2005 | Evans |
| 6,973,475 B2 | 12/2005 | Kenyon et al. |
| 6,976,228 B2 | 12/2005 | Bernhardson |
| 6,986,136 B2 | 1/2006 | Simpson et al. |
| 6,990,453 B2 | 1/2006 | Wang et al. |
| 7,013,301 B2 | 3/2006 | Holm et al. |
| 7,035,871 B2 | 4/2006 | Hunt et al. |
| 7,047,406 B2 | 5/2006 | Schleicher et al. |
| 7,072,886 B2 | 7/2006 | Salmenkaita et al. |
| 7,076,553 B2 | 7/2006 | Chan et al. |
| 7,085,747 B2 | 8/2006 | Schaffer et al. |
| 7,096,416 B1 | 8/2006 | Smith et al. |
| 7,120,619 B2 | 10/2006 | Drucker et al. |
| 7,136,934 B2 | 11/2006 | Carter et al. |
| 7,139,757 B1 | 11/2006 | Apollonsky et al. |
| 7,145,678 B2 | 12/2006 | Simpson et al. |
| 7,146,627 B1 | 12/2006 | Ismail et al. |
| 7,165,213 B1 | 1/2007 | Busey |
| 7,194,511 B2 | 3/2007 | Stettner |
| 7,219,145 B2 | 5/2007 | Chmaytelli et al. |
| 7,240,358 B2 | 7/2007 | Horn et al. |
| 7,274,661 B2 | 9/2007 | Harrell et al. |
| 7,277,955 B2 | 10/2007 | Elliott |
| 7,293,280 B1 | 11/2007 | Gupta et al. |
| 7,296,032 B1 | 11/2007 | Beddow |
| 7,296,284 B1 | 11/2007 | Price et al. |
| 7,305,449 B2 | 12/2007 | Simpson et al. |
| 7,315,984 B2 | 1/2008 | Crow et al. |
| 7,318,196 B2 | 1/2008 | Crow et al. |
| 7,340,481 B1 | 3/2008 | Baer et al. |
| 7,356,187 B2 | 4/2008 | Shanahan et al. |
| 7,370,342 B2 | 5/2008 | Ismail et al. |
| 7,426,537 B2 | 9/2008 | Lee et al. |
| 7,434,154 B2 | 10/2008 | Konetski |
| 7,437,364 B1 | 10/2008 | Fredricksen et al. |
| 7,441,041 B2 | 10/2008 | Williams et al. |
| 7,444,339 B2 | 10/2008 | Matsuda et al. |
| 7,457,511 B2 | 11/2008 | Putterman et al. |
| 7,457,790 B2 | 11/2008 | Kochunni et al. |
| 7,463,890 B2 | 12/2008 | Herz et al. |
| 7,469,283 B2 | 12/2008 | Eyal et al. |
| 7,509,291 B2 | 3/2009 | McBride et al. |
| 7,512,658 B2 | 3/2009 | Brown et al. |
| 7,523,156 B2 | 4/2009 | Giacalone, Jr. |
| 7,526,181 B2 | 4/2009 | Burges et al. |
| 7,535,903 B1 | 5/2009 | Patel |
| 7,546,118 B2 | 6/2009 | Camp, Jr. |
| 7,548,934 B1 | 6/2009 | Platt et al. |
| 7,593,921 B2 | 9/2009 | Goronzy et al. |
| 7,594,246 B1 | 9/2009 | Billmaier et al. |
| 7,600,243 B2 | 10/2009 | Brain et al. |
| 7,614,006 B2 | 11/2009 | Molander |
| 7,623,843 B2 | 11/2009 | Squibbs |
| 7,627,644 B2 | 12/2009 | Slack-Smith |
| 7,644,166 B2 | 1/2010 | Appelman et al. |
| 7,653,654 B1 | 1/2010 | Sundaresan |
| 7,657,337 B1 | 2/2010 | Evans et al. |
| 7,657,614 B2 | 2/2010 | Gyorfi et al. |
| 7,668,914 B2 | 2/2010 | Parker et al. |
| 7,669,219 B2 | 2/2010 | Scott, III |
| 7,676,753 B2 | 3/2010 | Bedingfield |
| 7,680,959 B2 | 3/2010 | Svendsen |
| 7,693,535 B2 | 4/2010 | Dunko |
| 7,694,225 B1 | 4/2010 | Weber et al. |
| 7,716,376 B1 | 5/2010 | Price et al. |
| 7,725,494 B2 | 5/2010 | Rogers et al. |
| 7,730,216 B1 | 6/2010 | Issa et al. |
| 7,734,569 B2 | 6/2010 | Martin et al. |
| 7,735,101 B2 | 6/2010 | Lanza et al. |
| 7,739,584 B2 | 6/2010 | Vella et al. |
| 7,751,773 B2 | 7/2010 | Linden |
| 7,761,399 B2 | 7/2010 | Evans |
| 7,765,192 B2 | 7/2010 | Svendsen |
| 7,783,703 B2 | 8/2010 | Rafey et al. |
| 7,790,975 B2 | 9/2010 | Eastwood et al. |
| 7,804,016 B2 | 9/2010 | Sagoo et al. |
| 7,805,129 B1 | 9/2010 | Issa et al. |
| 7,805,373 B1 | 9/2010 | Issa et al. |
| 7,818,770 B2 | 10/2010 | Ducheneaut et al. |
| 7,818,771 B2 | 10/2010 | Ducheneaut et al. |
| 7,827,110 B1 | 11/2010 | Wieder |
| 7,853,712 B2 | 12/2010 | Amidon et al. |
| 7,856,360 B2 | 12/2010 | Kramer et al. |
| 7,865,522 B2 | 1/2011 | Purdy et al. |
| 7,870,589 B2 | 1/2011 | Ducheneaut et al. |
| 7,873,983 B2 | 1/2011 | Ducheneaut et al. |
| 7,877,387 B2 | 1/2011 | Hangartner |
| 7,886,072 B2 | 2/2011 | Wormington et al. |
| 7,970,922 B2 | 6/2011 | Svendsen |
| 8,030,564 B2 | 10/2011 | Komori et al. |
| 8,051,130 B2 | 11/2011 | Logan et al. |
| 8,059,646 B2 | 11/2011 | Svendsen et al. |
| 8,060,525 B2 | 11/2011 | Svendsen et al. |
| 8,112,720 B2 | 2/2012 | Curtis |
| 8,117,193 B2 | 2/2012 | Svendsen et al. |
| 8,151,304 B2 | 4/2012 | Nathan et al. |
| 8,200,602 B2 | 6/2012 | Farrelly |
| 8,260,656 B1 * | 9/2012 | Harbick et al. ............... 705/7.31 |
| 8,332,425 B2 | 12/2012 | Svendsen et al. |
| 8,422,490 B2 | 4/2013 | Svendsen et al. |
| 8,434,024 B2 | 4/2013 | Curtis |
| 8,620,699 B2 | 12/2013 | Svendsen |
| 2001/0003099 A1 | 6/2001 | Von Kohorn |
| 2001/0013009 A1 | 8/2001 | Greening et al. |
| 2001/0025259 A1 | 9/2001 | Rouchon |
| 2002/0032723 A1 | 3/2002 | Johnson et al. |
| 2002/0052674 A1 | 5/2002 | Chang et al. |
| 2002/0067909 A1 | 6/2002 | Iivonen |
| 2002/0087382 A1 | 7/2002 | Tiburcio |
| 2002/0103796 A1 | 8/2002 | Hartley |
| 2002/0116533 A1 | 8/2002 | Holliman et al. |
| 2002/0138836 A1 | 9/2002 | Zimmerman |
| 2002/0144259 A1 | 10/2002 | Gutta et al. |
| 2002/0174426 A1 | 11/2002 | Gutta et al. |
| 2002/0178057 A1 | 11/2002 | Bertram et al. |
| 2002/0194325 A1 | 12/2002 | Chmaytelli et al. |
| 2002/0198882 A1 | 12/2002 | Linden et al. |
| 2003/0001907 A1 | 1/2003 | Bergsten et al. |
| 2003/0005074 A1 | 1/2003 | Herz et al. |
| 2003/0009459 A1 | 1/2003 | Chastain et al. |
| 2003/0014407 A1 | 1/2003 | Blatter et al. |
| 2003/0018799 A1 | 1/2003 | Eyal |
| 2003/0068155 A1 | 4/2003 | Vasilevsky et al. |
| 2003/0084044 A1 | 5/2003 | Simpson et al. |

(56) References Cited

U.S. PATENT DOCUMENTS

| | | |
|---|---|---|
| 2003/0084086 A1 | 5/2003 | Simpson et al. |
| 2003/0084151 A1 | 5/2003 | Simpson et al. |
| 2003/0101450 A1 | 5/2003 | Davidsson et al. |
| 2003/0137531 A1 | 7/2003 | Katinsky et al. |
| 2003/0147624 A1 | 8/2003 | Trajkovic et al. |
| 2003/0149581 A1 | 8/2003 | Chaudhri et al. |
| 2003/0149612 A1 | 8/2003 | Berghofer et al. |
| 2003/0153338 A1 | 8/2003 | Herz et al. |
| 2003/0188320 A1 | 10/2003 | Shing |
| 2003/0191753 A1 | 10/2003 | Hoch |
| 2003/0227478 A1 | 12/2003 | Chatfield |
| 2003/0229537 A1 | 12/2003 | Dunning et al. |
| 2003/0232614 A1 | 12/2003 | Squibbs |
| 2004/0088271 A1 | 5/2004 | Cleckler |
| 2004/0107821 A1 | 6/2004 | Alcalde et al. |
| 2004/0133657 A1 | 7/2004 | Smith et al. |
| 2004/0133908 A1 | 7/2004 | Smith et al. |
| 2004/0133914 A1 | 7/2004 | Smith et al. |
| 2004/0137882 A1 | 7/2004 | Forsyth |
| 2004/0162783 A1 | 8/2004 | Gross |
| 2004/0181540 A1 | 9/2004 | Jung et al. |
| 2004/0205107 A1 | 10/2004 | Yoon |
| 2004/0215793 A1 | 10/2004 | Ryan et al. |
| 2004/0221309 A1 | 11/2004 | Zaner et al. |
| 2004/0224638 A1 | 11/2004 | Fadell et al. |
| 2004/0225640 A1 | 11/2004 | Brown et al. |
| 2004/0252604 A1 | 12/2004 | Johnson et al. |
| 2004/0260778 A1 | 12/2004 | Banister et al. |
| 2004/0267604 A1 | 12/2004 | Gross |
| 2005/0015805 A1 | 1/2005 | Iwamura |
| 2005/0021420 A1 | 1/2005 | Michelitsch et al. |
| 2005/0021470 A1 | 1/2005 | Martin et al. |
| 2005/0022239 A1 | 1/2005 | Meuleman |
| 2005/0036557 A1 | 2/2005 | Balakrishnan et al. |
| 2005/0038819 A1 | 2/2005 | Hicken et al. |
| 2005/0038876 A1 | 2/2005 | Chaudhuri |
| 2005/0060350 A1 | 3/2005 | Baum et al. |
| 2005/0060666 A1 | 3/2005 | Hoshino et al. |
| 2005/0071418 A1 | 3/2005 | Kjellberg et al. |
| 2005/0091107 A1 | 4/2005 | Blum |
| 2005/0131866 A1 | 6/2005 | Badros |
| 2005/0138198 A1 | 6/2005 | May |
| 2005/0154764 A1 | 7/2005 | Riegler et al. |
| 2005/0154767 A1 | 7/2005 | Sako |
| 2005/0166245 A1 | 7/2005 | Shin et al. |
| 2005/0197961 A1 | 9/2005 | Miller et al. |
| 2005/0204398 A1 | 9/2005 | Ryal |
| 2005/0228830 A1 | 10/2005 | Plastina et al. |
| 2005/0251807 A1 | 11/2005 | Weel |
| 2005/0256866 A1 | 11/2005 | Lu et al. |
| 2005/0262141 A1 | 11/2005 | Miyamori |
| 2005/0278377 A1 | 12/2005 | Mirrashidi et al. |
| 2005/0278758 A1 | 12/2005 | Bodlaender |
| 2005/0286546 A1 | 12/2005 | Bassoli et al. |
| 2005/0289236 A1 | 12/2005 | Hull et al. |
| 2005/0289265 A1 | 12/2005 | Illowsky et al. |
| 2006/0002681 A1 | 1/2006 | Spilo et al. |
| 2006/0008256 A1 | 1/2006 | Khedouri et al. |
| 2006/0015378 A1 | 1/2006 | Mirrashidi et al. |
| 2006/0020662 A1 | 1/2006 | Robinson |
| 2006/0020973 A1 | 1/2006 | Hannum et al. |
| 2006/0048059 A1 | 3/2006 | Etkin |
| 2006/0053080 A1 | 3/2006 | Edmonson et al. |
| 2006/0059260 A1 | 3/2006 | Kelly et al. |
| 2006/0080716 A1 | 4/2006 | Nishikawa et al. |
| 2006/0083119 A1 | 4/2006 | Hayes |
| 2006/0087941 A1 | 4/2006 | Obradovich |
| 2006/0112343 A1 | 5/2006 | Ducheneaut et al. |
| 2006/0112344 A1 | 5/2006 | Ducheneaut et al. |
| 2006/0130120 A1 | 6/2006 | Brandyberry et al. |
| 2006/0143236 A1 | 6/2006 | Wu |
| 2006/0156242 A1 | 7/2006 | Bedingfield |
| 2006/0161621 A1 | 7/2006 | Rosenberg |
| 2006/0165379 A1 | 7/2006 | Agnihotri et al. |
| 2006/0173910 A1 | 8/2006 | McLaughlin |
| 2006/0174277 A1 | 8/2006 | Sezan et al. |
| 2006/0174311 A1 | 8/2006 | Ducheneaut et al. |
| 2006/0184558 A1 | 8/2006 | Martin et al. |
| 2006/0190616 A1 | 8/2006 | Mayerhofer et al. |
| 2006/0195479 A1 | 8/2006 | Spiegelman et al. |
| 2006/0195512 A1 | 8/2006 | Rogers et al. |
| 2006/0195513 A1 | 8/2006 | Rogers et al. |
| 2006/0195516 A1 | 8/2006 | Beaupre |
| 2006/0195521 A1 | 8/2006 | New et al. |
| 2006/0195789 A1 | 8/2006 | Rogers et al. |
| 2006/0200432 A1 | 9/2006 | Flinn et al. |
| 2006/0200435 A1 | 9/2006 | Flinn et al. |
| 2006/0218613 A1 | 9/2006 | Bushnell |
| 2006/0224757 A1 | 10/2006 | Fang et al. |
| 2006/0224971 A1 | 10/2006 | Paulin et al. |
| 2006/0239131 A1 | 10/2006 | Nathan et al. |
| 2006/0242201 A1 | 10/2006 | Cobb et al. |
| 2006/0242206 A1 | 10/2006 | Brezak et al. |
| 2006/0247976 A1 | 11/2006 | Posokhow et al. |
| 2006/0247980 A1 | 11/2006 | Mirrashidi et al. |
| 2006/0248209 A1 | 11/2006 | Chiu et al. |
| 2006/0259355 A1 | 11/2006 | Farouki et al. |
| 2006/0265409 A1 | 11/2006 | Neumann et al. |
| 2006/0265503 A1 | 11/2006 | Jones et al. |
| 2006/0265637 A1 | 11/2006 | Marriott et al. |
| 2006/0271961 A1 | 11/2006 | Jacoby et al. |
| 2006/0273155 A1 | 12/2006 | Thackson |
| 2006/0282304 A1 | 12/2006 | Bedard et al. |
| 2006/0282776 A1 | 12/2006 | Farmer et al. |
| 2006/0282797 A1 | 12/2006 | Barsness et al. |
| 2006/0282851 A1 | 12/2006 | Errico et al. |
| 2006/0282856 A1 | 12/2006 | Errico et al. |
| 2006/0288041 A1 | 12/2006 | Plastina et al. |
| 2006/0288074 A1 | 12/2006 | Rosenberg |
| 2006/0293909 A1 | 12/2006 | Miyajima et al. |
| 2007/0008927 A1 | 1/2007 | Herz et al. |
| 2007/0011237 A1 | 1/2007 | Mockett |
| 2007/0014536 A1 | 1/2007 | Hellman |
| 2007/0022437 A1 | 1/2007 | Gerken |
| 2007/0028171 A1 | 2/2007 | MacLaurin |
| 2007/0033292 A1 | 2/2007 | Sull et al. |
| 2007/0055926 A1 | 3/2007 | Christiansen et al. |
| 2007/0064626 A1 | 3/2007 | Evans |
| 2007/0074115 A1 | 3/2007 | Patten et al. |
| 2007/0083553 A1 | 4/2007 | Minor |
| 2007/0083929 A1 | 4/2007 | Sprosts et al. |
| 2007/0094081 A1 | 4/2007 | Yruski et al. |
| 2007/0094082 A1 | 4/2007 | Yruski et al. |
| 2007/0094083 A1 | 4/2007 | Yruski et al. |
| 2007/0094363 A1 | 4/2007 | Yruski et al. |
| 2007/0100904 A1 | 5/2007 | Casey et al. |
| 2007/0101369 A1 | 5/2007 | Dolph |
| 2007/0104138 A1 | 5/2007 | Rudolf et al. |
| 2007/0106672 A1 | 5/2007 | Sighart et al. |
| 2007/0106693 A1 | 5/2007 | Houh et al. |
| 2007/0110398 A1 | 5/2007 | Broeksteeg |
| 2007/0118425 A1 | 5/2007 | Yruski et al. |
| 2007/0118657 A1 | 5/2007 | Kreitzer et al. |
| 2007/0118853 A1 | 5/2007 | Kreitzer et al. |
| 2007/0130008 A1 | 6/2007 | Brown et al. |
| 2007/0130012 A1 | 6/2007 | Yruski et al. |
| 2007/0154171 A1 | 7/2007 | Elcock et al. |
| 2007/0162569 A1 | 7/2007 | Robinson et al. |
| 2007/0169148 A1 | 7/2007 | Oddo et al. |
| 2007/0198111 A1 | 8/2007 | Oetzel et al. |
| 2007/0199014 A1 | 8/2007 | Clark et al. |
| 2007/0214182 A1 | 9/2007 | Rosenberg |
| 2007/0214259 A1 | 9/2007 | Ahmed et al. |
| 2007/0214471 A1 | 9/2007 | Rosenberg |
| 2007/0220575 A1 | 9/2007 | Cooper et al. |
| 2007/0226315 A1 | 9/2007 | Espelien |
| 2007/0233736 A1 | 10/2007 | Xiong et al. |
| 2007/0238427 A1 | 10/2007 | Kraft et al. |
| 2007/0244880 A1 | 10/2007 | Martin et al. |
| 2007/0245243 A1 | 10/2007 | Lanza et al. |
| 2007/0245245 A1 | 10/2007 | Blue et al. |
| 2007/0264982 A1 | 11/2007 | Nguyen et al. |
| 2007/0265870 A1 | 11/2007 | Song et al. |
| 2007/0269169 A1 | 11/2007 | Stix et al. |

(56) References Cited

U.S. PATENT DOCUMENTS

| | | |
|---|---|---|
| 2007/0274187 A1 | 11/2007 | Schipper et al. |
| 2007/0277202 A1 | 11/2007 | Lin et al. |
| 2007/0280638 A1 | 12/2007 | Aoki et al. |
| 2007/0282949 A1 | 12/2007 | Fischer et al. |
| 2007/0283380 A1 | 12/2007 | Aoki et al. |
| 2007/0299873 A1 | 12/2007 | Jones et al. |
| 2007/0299874 A1 | 12/2007 | Neumann et al. |
| 2007/0299978 A1 | 12/2007 | Neumann et al. |
| 2008/0005179 A1 | 1/2008 | Friedman et al. |
| 2008/0016098 A1 | 1/2008 | Frieden et al. |
| 2008/0016205 A1* | 1/2008 | Svendsen ............... 709/224 |
| 2008/0031590 A1 | 2/2008 | Kulas |
| 2008/0031595 A1 | 2/2008 | Cho |
| 2008/0032723 A1 | 2/2008 | Rosenberg |
| 2008/0033959 A1 | 2/2008 | Jones |
| 2008/0037953 A1 | 2/2008 | Kawamura et al. |
| 2008/0040759 A1 | 2/2008 | She et al. |
| 2008/0046948 A1 | 2/2008 | Verosub |
| 2008/0052371 A1 | 2/2008 | Partovi et al. |
| 2008/0052380 A1 | 2/2008 | Morita et al. |
| 2008/0052630 A1 | 2/2008 | Rosenbaum et al. |
| 2008/0056675 A1 | 3/2008 | Wright et al. |
| 2008/0080448 A1 | 4/2008 | Rottinghaus |
| 2008/0080774 A1 | 4/2008 | Jacobs et al. |
| 2008/0085769 A1 | 4/2008 | Lutnick et al. |
| 2008/0086379 A1 | 4/2008 | Dion et al. |
| 2008/0088735 A1 | 4/2008 | Biniak et al. |
| 2008/0092062 A1 | 4/2008 | Motsinger |
| 2008/0120501 A1 | 5/2008 | Jannink et al. |
| 2008/0133763 A1 | 6/2008 | Clark et al. |
| 2008/0134043 A1 | 6/2008 | Georgis et al. |
| 2008/0134053 A1 | 6/2008 | Fischer |
| 2008/0141136 A1 | 6/2008 | Ozzie et al. |
| 2008/0147876 A1 | 6/2008 | Campbell et al. |
| 2008/0152309 A1 | 6/2008 | Shih et al. |
| 2008/0160983 A1 | 7/2008 | Poplett et al. |
| 2008/0162668 A1 | 7/2008 | Miller |
| 2008/0178094 A1 | 7/2008 | Ross |
| 2008/0181536 A1 | 7/2008 | Linden |
| 2008/0189336 A1 | 8/2008 | Prihodko |
| 2008/0189391 A1 | 8/2008 | Koberstein et al. |
| 2008/0189655 A1 | 8/2008 | Kol |
| 2008/0195664 A1 | 8/2008 | Maharajh et al. |
| 2008/0209013 A1 | 8/2008 | Weel |
| 2008/0216117 A1 | 9/2008 | Lee et al. |
| 2008/0228945 A1 | 9/2008 | Yoon et al. |
| 2008/0242221 A1 | 10/2008 | Shapiro et al. |
| 2008/0242280 A1 | 10/2008 | Shapiro et al. |
| 2008/0243733 A1 | 10/2008 | Black |
| 2008/0244681 A1 | 10/2008 | Gossweiler et al. |
| 2008/0250067 A1 | 10/2008 | Svendsen |
| 2008/0250312 A1 | 10/2008 | Curtis |
| 2008/0263014 A1 | 10/2008 | Garijo Mazario et al. |
| 2008/0270561 A1 | 10/2008 | Tang et al. |
| 2008/0276279 A1 | 11/2008 | Gossweiler et al. |
| 2008/0281783 A1 | 11/2008 | Papkoff et al. |
| 2008/0288588 A1 | 11/2008 | Andam et al. |
| 2008/0306826 A1 | 12/2008 | Kramer et al. |
| 2008/0307462 A1 | 12/2008 | Beetcher et al. |
| 2008/0307463 A1 | 12/2008 | Beetcher et al. |
| 2008/0313541 A1 | 12/2008 | Shafton et al. |
| 2008/0317439 A1 | 12/2008 | Wong et al. |
| 2008/0319833 A1 | 12/2008 | Svendsen |
| 2009/0007198 A1 | 1/2009 | Lavender et al. |
| 2009/0013347 A1 | 1/2009 | Ahanger et al. |
| 2009/0016696 A1 | 1/2009 | Hsieh et al. |
| 2009/0044216 A1 | 2/2009 | McNicoll |
| 2009/0046101 A1 | 2/2009 | Askey et al. |
| 2009/0049045 A1 | 2/2009 | Askey et al. |
| 2009/0049051 A1* | 2/2009 | Horowitz et al. ............. 707/10 |
| 2009/0055467 A1 | 2/2009 | Petersen |
| 2009/0055759 A1 | 2/2009 | Svendsen |
| 2009/0060467 A1 | 3/2009 | Grigsby et al. |
| 2009/0069911 A1 | 3/2009 | Stefik |
| 2009/0069912 A1 | 3/2009 | Stefik |
| 2009/0070185 A1 | 3/2009 | Farrelly |
| 2009/0070350 A1 | 3/2009 | Wang |
| 2009/0076881 A1 | 3/2009 | Svendsen |
| 2009/0077041 A1 | 3/2009 | Eyal et al. |
| 2009/0077052 A1 | 3/2009 | Farrelly |
| 2009/0077084 A1 | 3/2009 | Svendsen |
| 2009/0077124 A1 | 3/2009 | Spivack et al. |
| 2009/0077220 A1* | 3/2009 | Svendsen et al. ............. 709/224 |
| 2009/0083116 A1 | 3/2009 | Svendsen |
| 2009/0083117 A1 | 3/2009 | Svendsen et al. |
| 2009/0083362 A1 | 3/2009 | Svendsen |
| 2009/0083541 A1 | 3/2009 | Levine |
| 2009/0089288 A1 | 4/2009 | Petersen |
| 2009/0093300 A1 | 4/2009 | Lutnick et al. |
| 2009/0094248 A1 | 4/2009 | Petersen |
| 2009/0102983 A1 | 4/2009 | Malone et al. |
| 2009/0125588 A1 | 5/2009 | Black et al. |
| 2009/0138457 A1 | 5/2009 | Askey |
| 2009/0138505 A1 | 5/2009 | Purdy |
| 2009/0164199 A1 | 6/2009 | Amidon et al. |
| 2009/0164429 A1* | 6/2009 | Svendsen et al. ................. 707/3 |
| 2009/0164514 A1 | 6/2009 | Svendsen et al. |
| 2009/0164516 A1 | 6/2009 | Svendsen et al. |
| 2009/0178003 A1 | 7/2009 | Fiedler |
| 2009/0183220 A1 | 7/2009 | Amento et al. |
| 2009/0222392 A1 | 9/2009 | Martin et al. |
| 2009/0222520 A1 | 9/2009 | Sloo et al. |
| 2009/0232481 A1 | 9/2009 | Baalbergen et al. |
| 2009/0249222 A1 | 10/2009 | Schmidt et al. |
| 2009/0249223 A1 | 10/2009 | Barsook et al. |
| 2009/0276821 A1 | 11/2009 | Amento et al. |
| 2009/0282102 A1 | 11/2009 | Geurts et al. |
| 2009/0317060 A1 | 12/2009 | Han et al. |
| 2010/0017261 A1 | 1/2010 | Evans et al. |
| 2010/0017474 A1 | 1/2010 | Kandekar et al. |
| 2010/0031366 A1 | 2/2010 | Knight et al. |
| 2010/0063873 A1 | 3/2010 | McGucken |
| 2010/0077306 A1 | 3/2010 | Shaffer et al. |
| 2010/0082727 A1 | 4/2010 | Zalewski |
| 2010/0111491 A1 | 5/2010 | Kamoto |
| 2010/0125876 A1 | 5/2010 | Craner et al. |
| 2010/0172379 A1 | 7/2010 | Guignard et al. |
| 2010/0185732 A1 | 7/2010 | Hyman |
| 2010/0186034 A1 | 7/2010 | Walker |
| 2010/0198767 A1 | 8/2010 | Farrelly |
| 2010/0199295 A1 | 8/2010 | Katpelly et al. |
| 2010/0223649 A1 | 9/2010 | Suitts et al. |
| 2010/0228740 A1 | 9/2010 | Cannistraro et al. |
| 2010/0306671 A1 | 12/2010 | Mattingly et al. |
| 2010/0324704 A1 | 12/2010 | Murphy et al. |
| 2010/0325123 A1 | 12/2010 | Morrison et al. |
| 2011/0016483 A1 | 1/2011 | Opdycke |
| 2011/0034121 A1 | 2/2011 | Ng et al. |
| 2011/0184899 A1 | 7/2011 | Gadanho et al. |
| 2012/0054233 A1 | 3/2012 | Svendsen et al. |
| 2012/0072418 A1 | 3/2012 | Svendsen et al. |
| 2012/0072610 A1 | 3/2012 | Svendsen |
| 2012/0072846 A1 | 3/2012 | Curtis |
| 2012/0072852 A1 | 3/2012 | Svendsen et al. |
| 2012/0117017 A1 | 5/2012 | Phillips et al. |
| 2012/0143956 A1 | 6/2012 | Svendsen |

FOREIGN PATENT DOCUMENTS

| | | |
|---|---|---|
| CN | 1614931 | 5/2005 |
| EP | 898278 | 2/1999 |
| EP | 1536352 | 6/2005 |
| EP | 1684516 | 7/2006 |
| EP | 2105849 | 9/2009 |
| GB | 2372850 | 9/2002 |
| JP | 2008258685 | 10/2008 |
| WO | WO 95/34169 | 12/1995 |
| WO | WO 01/25947 | 4/2001 |
| WO | WO 2004/017178 | 2/2004 |
| WO | WO 2005/013617 | 2/2005 |
| WO | WO 2006/082566 | 8/2006 |
| WO | WO 2006/109066 | 10/2006 |

(56) References Cited

FOREIGN PATENT DOCUMENTS

| WO | WO 2007/069004 | 6/2007 |
|----|----------------|--------|
| WO | WO 2008/102331 | 8/2008 |
| WO | WO 2010/034063 | 4/2010 |

OTHER PUBLICATIONS

Blakowski, G. and Steinmetz, R., "A Media Synchronization Survey: Reference Model, Specification, and Case Studies," IEEE Journal on Selected Areas in Communications, vol. 14, No. 1, Jan. 1996, found at <http://www.cs.uiuc.edu/class/sp08/cs414/SyncPaper.pdf>, 31 pages.

Kaji, Katsuhiko et al., "A Music Recommendation System Based on Annotations about Listeners' Preferences and Situations," Proceedings of the First International Conference on Automated Production of Cross Media Content for Multi-Channel Distribution (AXMEDIS'05), Nov. 30-Dec. 2, 2005, Florence, Italy, copyright 2005, IEEE, 4 pages.

Kosugi, Naoko et al., "A Practical Query-By-Humming System for a Large Music Database,"Proceedings of the 8th ACM International Conference on Multimedia, Oct. 30-Nov. 3, 2000, Los Angeles, California, copyright 2000, ACM, pp. 333-342.

Waldegg, Daniela B., "A Temporal Synchronization-based Scheduling Policy for Adaptive Multimedia Presentation Applications," Telecom Bretagne, Networks and Multimedia Services Department, Cesson-Sevigne, France, Dec. 1996, found at <http://cimic.rutgers.edu/~ahgomaa/ua/research/temp_sync.pdf>, 4 pages.

"Affordable Web Meetings—Dimdim," found at <http://www.dimdim.com/products/what_is_dimdim.html> on Internet Archive, dated May 28, 2010, printed Oct. 25, 2011, 4 pages.

Amazon Kindle, found at <https://kindle.amazon.com/help/show/popular_highlights_help>, copyright 2011, Amazon.com, Inc., printed on Oct. 25, 2011, 1 page.

"Amazon.com: Online Shopping for Electronics, Apparel, Computers, Books, DVDs & m . . . ," at <http://www.amazon.com/>, copyright 1996-2007, Amazon.com, Inc., printed Oct. 26, 2007, 4 pages.

Manvi, S.S. and Venkataram, P., "An agent based synchronization scheme for mulitmedia applications," The Journal of Systems and Software, 79, 2006, pp. 701-713, available online Sep. 28, 2005, found at <http://www.semgrid.net/Citation-Before-2006.1/%2B%2BJSS-2006-Agent.pdf>, 13 pages.

Huang, Yao-Chang et al., "An Audio Recommendation System Based on Audio Signature Description Scheme in MPEG-7 Audio," IEEE International Conference on Multimedia and Expo (ICME), Jun. 27-30, 2004, IEEE, pp. 639-642.

"Anthem—Overview," at <http://www.intercastingcorp.com/platform/anthem>, copyright 2004-2007, Intercasting Corp., printed Jan. 16, 2008, 2 pages.

"Apple—iPod+iTunes," at <http://www.apple.com/itunes/>, copyright 2007 by Paramount Pictures, printed Feb. 7, 2007, 2 pages.

"Apple—iTunes—What is iTunes?—A player, a store, and more," at <http://www.apple.com/itunes/whatis/>, printed Aug. 11, 2009, 2 pages.

Sussman, R. and Laroche, J., "Application of the Phase Vocoder to Pitch-Preserving Synchronization of an Audio Stream to an External Clock," Proceedings of 1999 IEEE Workshop on Applications of Signal Processing to Audio and Acoustics, New Peitz, New York, Oct. 17-20, 1999, found at <http://citeseerx.ist.psu.edu/viewdoc/download?doi=10.1.1.59.9808&rep=rep1&type=pdf>, 4 pages.

"Babulous :: Keep it loud," at <http://www.babulous.com/home.jhtml>, copyright 2009, Babulous, Inc., printed Mar. 26, 2009, 2 pages.

Wauters, Robin, "beeTV Raises $8 Million for Stunning Personal TV Recommendation System," Jun. 3, 2009, TechCrunch, at <http://techcrunch.com/2009/06/03/beetv-raises-8-million-for-stunning-personal-tv-recommendation-system/>, printed Dec. 2, 2011, 15 pages.

"Better Propaganda—Free MP3s and music videos," at <http://www.betterpropaganda.com/>, copyright 2004-2005, betterPropaganda, printed Feb. 7, 2007, 4 pages.

"Digital Tech Life >> Download of the Week," earliest post Sep. 30, 2005, latest post Jul. 2, 2006, at <http://www.digitaltechlife.com/category/download-of-the-week/>, printed Feb. 16, 2007, 9 pages.

"Digital Music News," at <http://www.digitalmusicnews.com/results?title=musicstrands>, copyright Jun. 2003 Digital Music News, earliest post Aug. 2005, latest post May 2006, printed Aug. 8, 2006, 5 pages.

Jameson, A. et al., "Enhancing Mutual Awareness in Group Recommender Systems," in B. Mobasher & S.S. Anand (Eds.), Proceedings of the Int. Joint Conference on Artificial Intelligence 2003 Workshop on Intelligent Techniques for Web Personalization, Aug. 9-15, 2003, Acapulco, Mexico, 8 pages.

Martin Halvey et al., "Exploring Social Dynamics in Online Media Sharing," pp. 1273-1274, WWW 2007, May 8-12, 2007, Banff, Alberta, Canada, http://portal.acm.org/citation.cfm?id=1242804, 2 pages.

"Feature Wishlist (New Plugins)—MythTV," at <http://www.mythtv.org/wiki/Feature_Wishlist_(New_Plugins)>, web page last modified on Jan. 3, 2010, 5 pages.

"Google Wave Overview," found at <http://wave.google.com/about.html> on Internet Archive, dated May 27, 2010, printed Oct. 25, 2011, 1 page.

"Goombah" Preview, at <http://www.goombah.com/preview.html>, printed Jan. 8, 2008, 5 pages.

"Gracenote," found at <http://www.gracenote.com>, printed Feb. 7, 2007, available on Internet Archive at least as early as Jan. 2006, 1 page.

Harboe, Gunnar, "Chapter 1—In Search of Social Television," In: P. Cesar, D. Geerts, and K. Chorianopoulos (editors), Social interactive television: Immersive shared experiences and perspectives, Hershey, Pennsylvania, Information Science Reference, pp. 1-13, found at <http://www.igi-global.com/downloads/excerpts/33443.pdf>, copyright 2009, IGI Global, 13 pages.

"iLikeTM—Home," found at <http://www.ilike.com/>, copyright 2007, iLike, printed May 17, 2007, 2 pages.

McKinney, D. et al., "iTunes University and the classroom: Can podcasts replace Professors?", Computers & Education, vol. 52, Issue 3, Apr. 2009, pp. 617-623, Copyright 2008, Elsevier Ltd., found at <http://www.fredonia.edu/department/psychology/pdf/CAE1263.pdf>, 7 pages.

"Last.fm—The Social Music Revolution," at <http://www.last.fm/>, printed Feb. 7, 2007, 1 page.

"Last.fm—Wikipedia, the free encyclopedia," at <http://en.wikipedia.org/wiki/Last.fm>, last modified on Aug. 8, 2006, printed Aug. 8, 2006, 7 pages.

"LimeWire—Wikipedia, the free encyclopedia," at <http://en.wikipedia.org/wiki/LimeWire>, last modified Aug. 6, 2006, printed Aug. 8, 2006, 2 pages.

"LinkedIn: Relationships Matter," at <http://www.linkedin.com/>, date unknown but website dates back to at least 2003, copyright 2009, LinkedIn Corportaion, printed Jan. 22, 2009, 1 page.

"Liveplasma music, movies, search engine and discovery engine," at <http://www.liveplasma.com>, printed May 17, 2007, 1 page.

"Loomia Personalized Recommendations for Media, Content and Retail Sites," at <http://www.loomia.com/>, copyright 2006-2007, Loomia Inc., printed Feb. 7, 2007, 2 pages.

"Mercora—Music Search and Internet Radio Network," at <http://www.mercora.com/overview.asp>, copyright 2004-2006, Mercora, Inc., printed Aug. 8, 2006, 1 page.

Henry, Alan, "MixxMaker: The Mix Tape Goes Online," Jan. 18, 2008, AppScout, found at <http://appscout.pcmag.com/crazy-start-ups-vc-time/276029-mixxmaker-the-mix-tape-goes-online#fbid=DfUZtDa46ye>, printed Nov. 15, 2011, 4 pages.

"MP3 music download website, eMusic," at <http://www.emusic.com/>, copyright 2007, eMusic.com Inc., printed Feb. 7, 2007, 1 page.

Wang, J. and Reinders, M.J.T., "Music Recommender system for Wi-Fi Walkman," No. ICT-2003-01 in the ICT Group Technical Report Series, Information & Communication Theory Group, Department of Mediamatics, Faculty of Electrical Engineering, Mathematics and Computer Science, Delft University of Technology, Delft, The Netherlands, 2003, 23 pages.

(56) References Cited

OTHER PUBLICATIONS

"musicIP—The Music Search Engine," at <http://www.musicip.com/>, copyright 2006-2007, MusicIP Corporation, printed Feb. 7, 2007, 1 page.
"Musicstrands.com—Because Music is Social," brochure, copyright 2006, MusicStrands, Inc., 2 pages.
Pampalk, E. and Goto, M., "MusicSun: A New Approach to Artist Recommendation," In Proceedings of the 8th International Conference on Music Information Retrieval (ISMIR 2007), Vienna, Austria, Sep. 23-27, 2007, copyright 2007, Austrian Computer Society (OCG), found at <http://citeseerx.ist.psu.edu/viewdoc/download-?doi=10.1.1.69.1403&rep=rep1&type=pdf>, 4 pages.
"MySpace," at <http://www.myspace.com/>, copyright 2003-2008, MySpace.com, printed Jan. 16, 2008, 2 pages.
"MyStrands Social Recommendation and Discovery," at <http://www.mystrands.com/>, copyright 2003-2007 MediaStrands, Inc., printed Feb. 7, 2007, 2 pages.
"MyStrands Download," at <http://www.mystrands.com/overview.vm>, copyright 2003-2007, MediaStrands, Inc., printed Feb. 7, 2007, 3 pages.
"MyStrands for Windows 0.7.3 Beta," copyright 2002-2006, ShareApple.com networks, printed Jul. 16, 2007, 3 pages.
"MyStrands for Windows Change Log," at <http://www.mystrands.com/mystrands/windows/changelog.vm>, earliest log dated Feb. 2006, printed Jul. 16, 2007, 6 pages.
"MyStrands Labs: Patent-pending Technologies," at <http://labs.mystrands.com/patents.html>, earliest description from Nov. 2004,printed Feb. 7, 2007, 5 pages.
"Napster—All the Music You Want," at <http://www.napstercom/using_napster/all_the_nnusic_you_want.html>, copyright 2003-2006, Napster, LLC, printed Feb. 7, 2007, 2 pages.
"North American Consumer DVR and Space-shifting Devices Markets," at <frost.com/prod/.../report-brochure.pag? . . . >, Aug. 31, 2005, Frost & Sullivan Research Service, printed Feb. 24, 2010, 6 pages.
"Pandora Internet Radio—Find New Music, Listen to Free Web Radio," at <http://www.pandora.com/>, copyright 2005-2007, Pandora Media, Inc., printed Feb. 7, 2007, 1 page.
Sarwar, Badrul M. et al., "Recommender Systems for Large-scale E-Commerce: Scalable Neighborhood Formation Using Clustering," Proceedings of the Fifth ♂ International Conference on Computer and Information Technology, Dec. 27-28, 2002, East West University, Dhaka, Bangladesh, 6 pages.
"Review of Personalization Technologies: Collaborative Filtering vs. ChoiceStream's Attributized Bayesian Choice Modeling," Technology Brief, ChoiceStream, Feb. 4, 2004, found at <http://www.google.com/url?sa=t&rct=j&g=choicestream%20review%20of%20personalization&source=web&cd=1&ved=0CDcQFjAA&url=http%3A%2F%2Fwww.behavioraltargeting.info%2Fdownloadattachment.php%3Fald%3Dcf74d490a8b97edd535b4ccdbfd0df55%26articleId%3D31&ei=C2jeTr71AurZ0QGCgsGvBw&usg=AFQjCNEBLn7jJCDh-VYty3h79uFKGFBkRw>, 13 pages.
Cai, Rui et al., "Scalable Music Recommendation by Search," Proc. ACM Multimedia, Augsburg, Germany, Sep. 23-28, 2007, pp. 1065-1074.
"Site for Sale: Showfilter.com Personalized TV Show Recommendation Engine—Flippa," at <http://flippa.com/auctions/56018>, auction item listed on site on Jan. 18, 2009, printed Jan. 4, 2010, 5 pages.
Weisz, J.D., "Social Online Video Experiences," Thesis Proposal, Mar. 2008, School of Computer Science, Carnegie Mellon University, Pittsburgh, Pennsylvania, 79 pages.
Oehlberg, L. et al., "Social TV: Designing for Distributed, Sociable Television Viewing," Proceedings of the 4th EuroITV Conference, May 25-26, 2006, Athens, Greece, pp. 251-259, 10 pages.
Gartrell, Charles M., "SocialAware: Context-Aware Multimedia Presentation via Mobile Social Networks," Masters Thesis, submitted to the Faculty of the Graduate School of the University of Colorado, directed by Dr. Richard Han, Department of Computer Science, 2008, found at <http://www.cs.colorado.edu/~rhan/Papers/Mike_Gartrell_CU_MS_thesis-final.pdf>, 42 pages.

"Soundflavor," at <http://www.soundflavor.com/>, copyright 2003-2007, Soundflavor, Inc., printed Feb. 7, 2007, 1 page.
"Start Listening with Last.fm," at <http://www.last.fm/>, date unknown but may date back as early as 2002, 1 page.
Gitzen, Aaron, "STIC Search Report EIC 3600," for Case Serial No. 11961730, Apr. 5, 2012, 32 pages.
"Subscribe to Napster," at <http://www.napster.com/subscribe>, found on the Internet Archive, dated Aug. 6, 2006, copyright 2003-2006, Napster, LLC, printed Dec. 21, 2011, 4 pages.
Looms, Thelma Drayton, "Sync-by-CBA: Using Metadata for Content-Based Associations to Facilitate Logically Synchronized and Adaptive Multimedia Presentations," dissertation submitted to the Faculty of the School of Engineering and Applied Science of the George Washington University, May 19, 2002, Professor C. Dianne Martin, found at <http://users.rcn.com/tlooms/TLooms_Dissertation_Excerpts.pdf>, 26 pages.
"Take a look at the Future of Mobile Music—Music Guru," at <http://www.symbian-freak.com/news/006/02/music_guru.htm> Feb. 23, 2006, copyright 2005, Symbian freak, printed Feb. 7, 2007, 3 pages.
"That canadian girl >> Blog Archive >> GenieLab," posted Feb. 22, 2005, at <http://www.thatcanadiangirl.co.uk/blog/2005/02/22/genielab/>, copyright 2007, Vero Pepperrell, printed Feb. 16, 2007, 3 pages.
Barrie-Anthony, Steven, "That song sounds familiar," Los Angeles Times, Feb. 3, 2006, available from <http://www.calendarlive.com/printedition/calendar/cl-et-pandora3feb03,0,7458778.story?track=tottext,0,19432.story?track=tothtml>, printed Feb. 3, 2006, 5 pages.
Nealon, Andrew D., "The Daily Barometer—GenieLab.com grants music lovers' wishes," posted Feb. 16, 2005, at <http://media.barometer.orst.edu/home/index.cfm?event=displayArticlePrinterFriendly&uSt . . . >, copyright 2007, The Daily Barometer, printed Feb. 16, 2007, 2 pages.
Golbeck, Jennifer, "Trust and Nuanced Profile Similarity in Online Social Networks," MINDSWAP Technical Report TR-MS1284, 2006, available from <http://www.cs.umd.edu/~golbeck/publications.shtml>, 30 pages.
"Try Napster free for 7 Days—Play and download music without paying per song.," http://www.napster.com/choose/index.html, copyright 2003-2007 Napster, LLC, printed Feb. 7, 2007, 1 page.
"UpTo11.net—Music Recommendations and Search," at <http://www.upto11.net/>, copyright 2005-2006, Upto11.net, printed Feb. 7, 2007, 1 page.
Smith, M.A. and Kanade, T., "Video Skimming for Quick Browsing based on Audio and Image Characterization," Jul. 30, 1995, tech. report CMU-CS-95-186, School of Computer Science, Carnegie Mellon University, Pittsburgh, Pennsylvania, found at <http://citeseerist.psu.edu/viewdoc/download;jsessionid=2141C7572FEBCF37FD9E7DFA1103758B?doi=10.1.1.33.1714&rep=rep1&type=pdf>, 24 pages.
Weisz, J. D. et al., "Watching Together: Intergrating Text Chat with Video," CHI 2007 Proceedings, Video, Apr. 28-May 3, 2007, San Jose, California, found at <http://esm.cs.cmu.edu/technology/papers/Chi.WatchingTogether.2007.pdf>, 10 pages.
Cohen, William W., "Web-Collaborative Filtering: Recommending Music by Spidering the Web," Computer Networks: The International Journal of Computer and Telecommunications Networking, 33(1-6), pp. 685-698, Jun. 2000, 20 pages.
"Webjay—Playlist Community," at <http://www.webjay.org/>, copyright 2006, Yahoo! Inc., printed Feb. 7, 2007, 5 pages.
"Welcome to Facebook!—Facebook," http://www.facebook.com/, copyright 2008 Facebook, printed Jan. 9, 2009, 1 page.
"Welcome to the Musicmatch Guide," at <http://www.mmguide.musicmatch.com/>, copyright 2001-2004, Musicmatch, Inc., printed Feb. 7, 2007, 1 page.
Dean, Katie, "Whose Song Is That, Anyway?," Wired News, Feb. 12, 2003, at <http://www.wired.com/news/digiwood/1,57634-0.html>, copyright 2005, Lycos, Inc., printed Oct. 9, 2006, 3 pages.
Wang, J. et al., "Wi-Fi Walkman: A wireless handhold that shares and recommend music on peer-to-peer networks," in Proceedings of Embedded Processors for Multimedia and Communications II, part of the IS&T/SPIE Symposium on Electronic Imaging 2005, Jan. 16-20, 2005, San Jose, California, Proceedings published Mar. 8,

(56) References Cited

OTHER PUBLICATIONS 2005, found at <http://citeseerx.ist.psu.edu/viewdoc/download?doi=10.1.1.108.3459&rep=rep1&type=pdf>, 10 pages.

"Yahoo Music Jukebox," Wikipedia, at <http://en.wikipedia.org/wiki/Yahoo_music_engine>, last modified Aug. 3, 2006, printed Aug. 8, 2006, 1 page.

"Yahoo! Music," at <http://info.yahoo.com/privacy/ca/yahoo/music/>, Aug. 14, 2007, copyright 2007, Yahoo! Canada Co., obtained from the Internet Archive, printed Apr. 19, 2011, 4 pages.

"Yahoo's new Live Video API," http://blog.programmableweb.com/category/video/, Feb. 8, 2008, printed Apr. 2, 2008, 13 pages.

"YouTube—Broadcast Yourself.," at <http://www.youtube.com/>, copyright 2007, YouTube, LLC, printed Oct. 26, 2007, 2 pages.

Liu, Y. et al., "Zync: the design of synchronized video sharing," Proceedings of DUX '07 (2007 Conference on Designing for User eXperiences), Nov. 5-7, 2007, Chicago, Illinois, 9 pages.

* cited by examiner

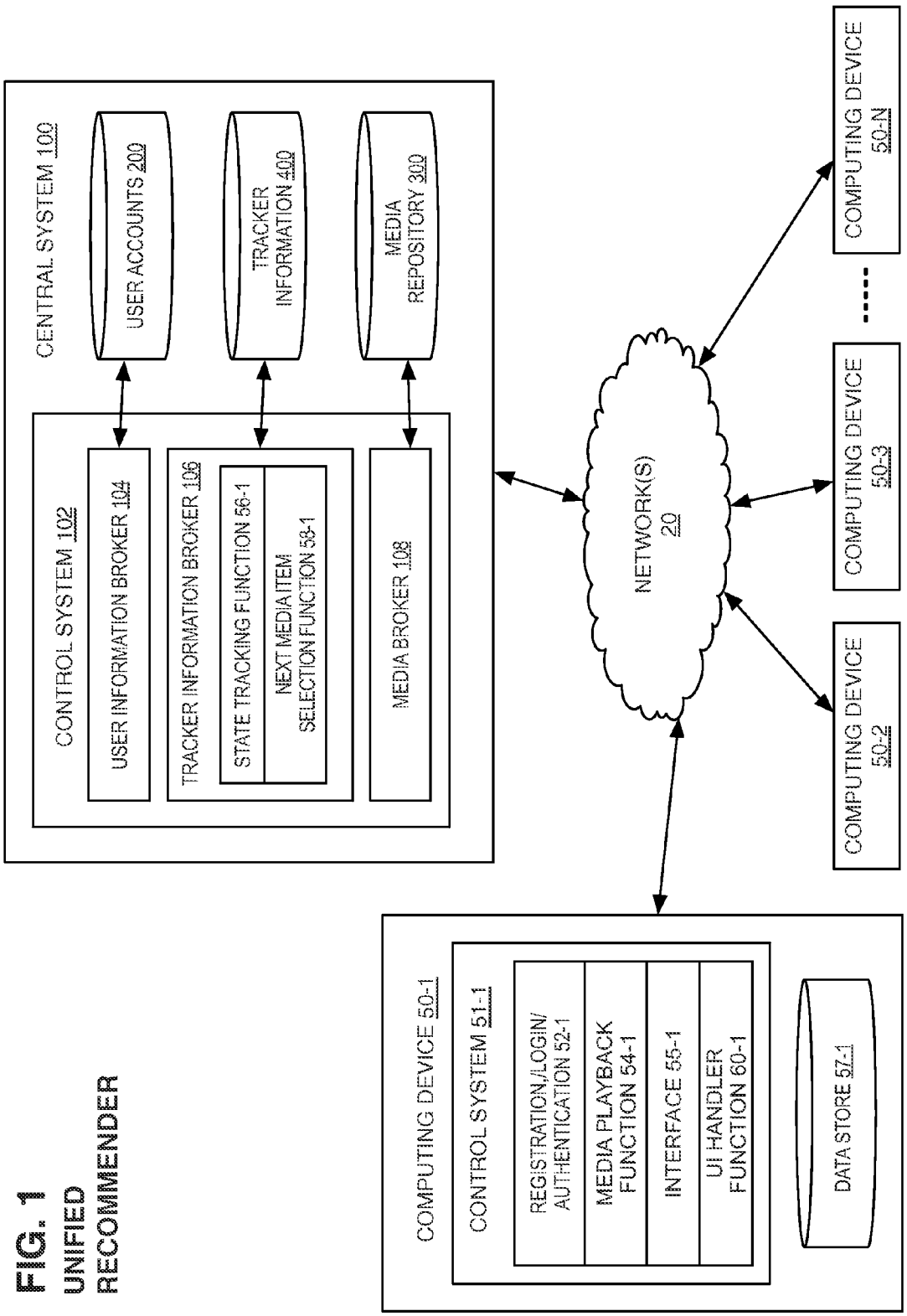

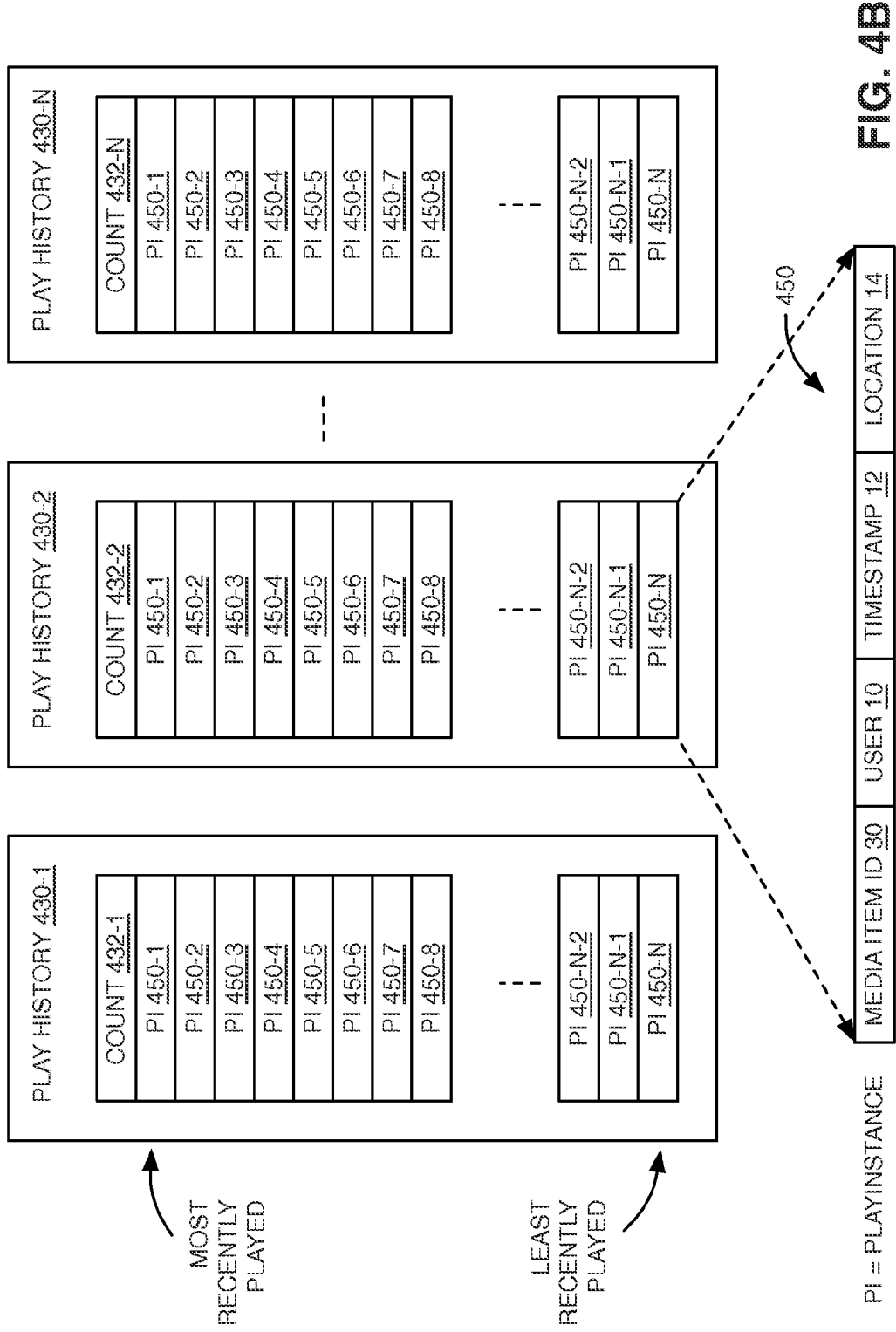

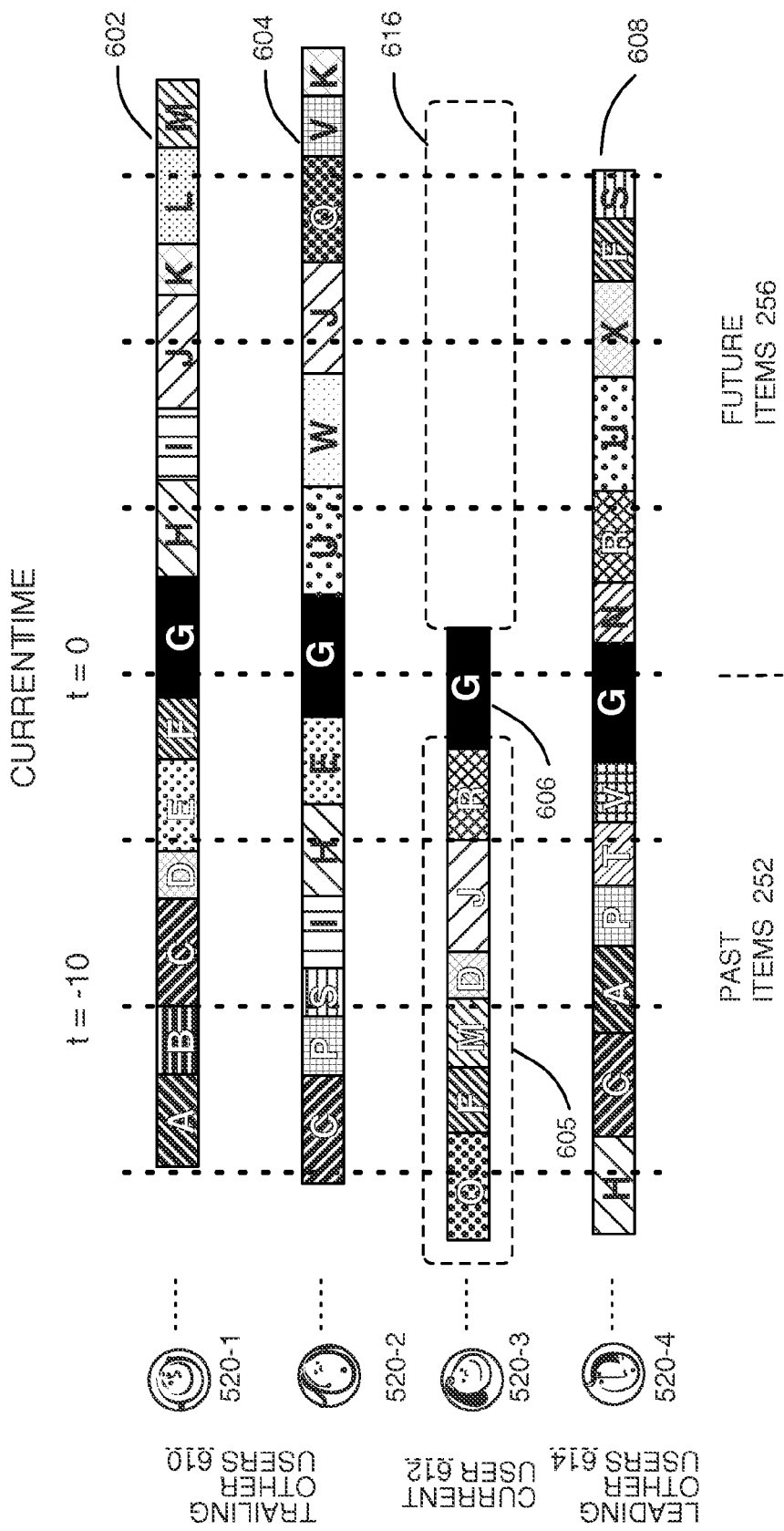

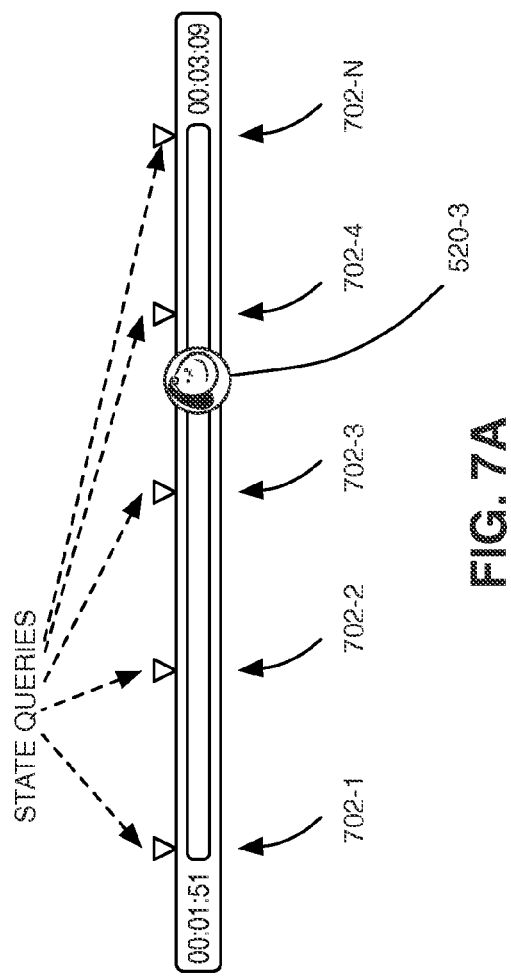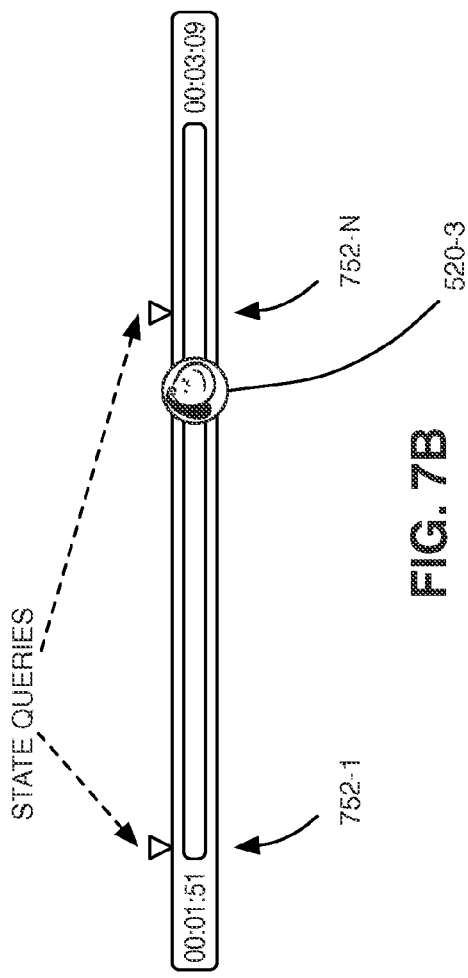

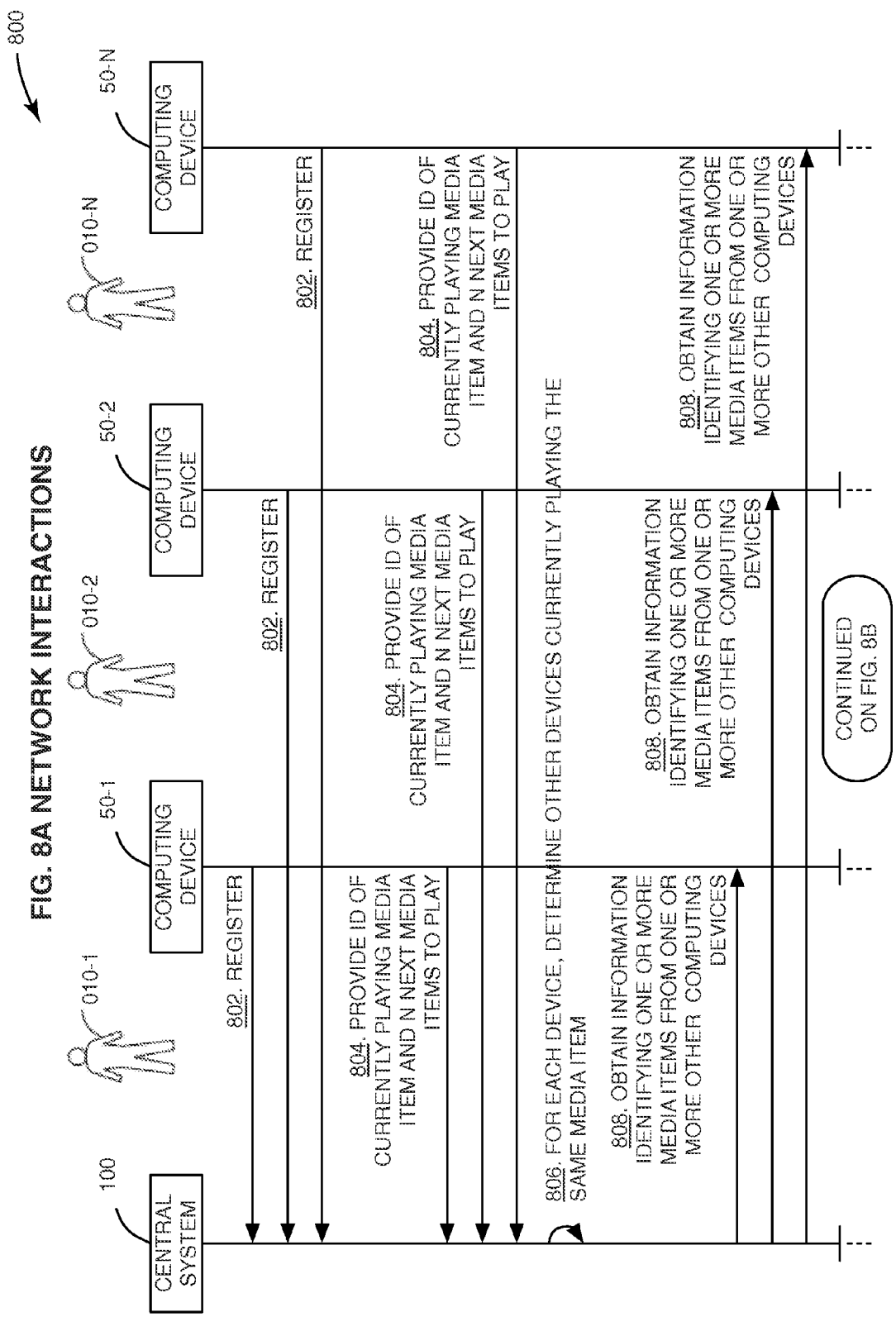

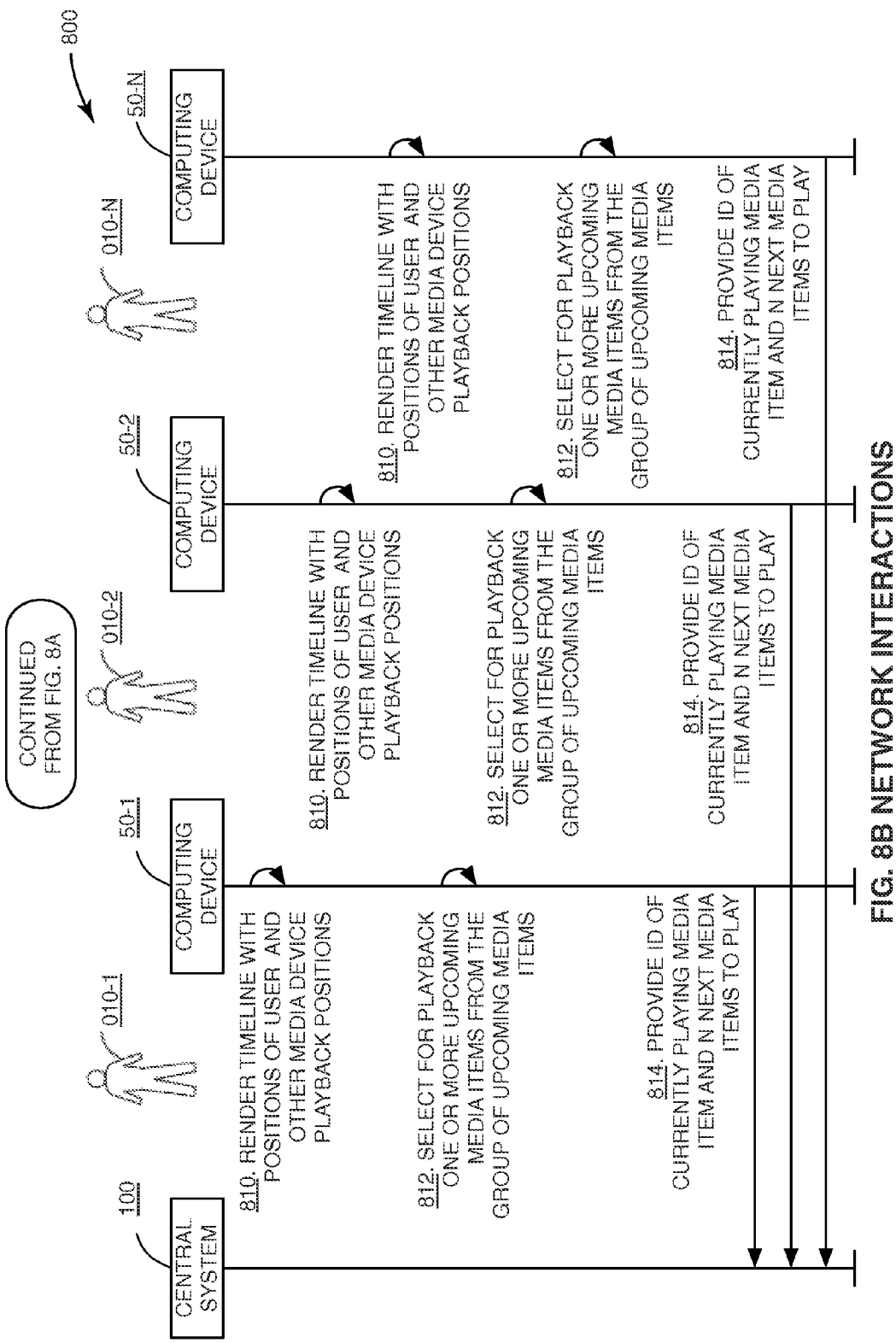
FIG. 8B NETWORK INTERACTIONS

| | 1802 | 1804 | 1806 | 1808 | 1810 | 1812 | 1814 |
|---|---|---|---|---|---|---|---|
| | MEDIA ITEM | CONTRIBUTOR | LIST DISTANCE | SOCIAL DISTANCE | NO REPEAT | SUB SCORE | FINAL SCORE |
| | A | | | | | | 0.29 |
| | | 520-1 | −6 | 1 | | 0.17 | |
| | | 520-4 | −4 | 2 | | 0.13 | |
| | B | | | | | | 0.20 |
| | | 520-1 | −5 | 1 | | 0.20 | |
| | C | | | | | | 0.52 |
| | | 520-1 | −4 | 1 | | 0.25 | |
| | | 520-2 | −6 | 1 | | 0.17 | |
| | | 520-4 | −5 | 2 | | 0.10 | |
| 1816 | D | | | | | | 0.33 |
| | | 520-1 | −3 | 1 | | 0.33 | |
| | | 520-3 | −2 | 0 | X | | |
| | E | | | | | | 1.50 |
| | | 520-1 | −2 | 1 | | 0.50 | |
| | | 520-2 | −1 | 1 | | 1.00 | |
| 1816 | F | | | | | | 1.10 |
| | | 520-1 | −1 | 1 | | 1.00 | |
| | | 520-3 | −5 | 0 | X | | |
| | | 520-4 | 5 | 2 | | 0.10 | |
| 1818 | G | | | | | | |
| | | 520-1 | 0 | 1 | | | |
| | | 520-2 | 0 | 1 | | | |
| | | 520-3 | 0 | 0 | X | | |
| | | 520-4 | 0 | 2 | | | |
| 1820 | H | | | | | | 1.58 |
| | | 520-1 | 1 | 1 | | 1.00 | |
| | | 520-2 | −2 | 1 | | 0.50 | |
| | | 520-4 | −6 | 2 | | 0.08 | |
| | I | | | | | | 0.83 |
| | | 520-1 | 2 | 1 | | 0.50 | |
| | | 520-2 | −3 | 1 | | 0.33 | |
| 1816 | J | | | | | | 0.67 |
| | | 520-1 | 3 | 1 | | 0.33 | |
| | | 520-2 | 3 | 1 | | 0.33 | |
| | | 520-3 | −2 | 0 | X | | |

FIG. 18A

| | 1802 | 1804 | 1806 | 1808 | 1810 | 1812 | 1814 |
|---|---|---|---|---|---|---|---|
| | MEDIA ITEM | CONTRIBUTOR | LIST DISTANCE | SOCIAL DISTANCE | NO REPEAT | SUB SCORE | FINAL SCORE |
| | K | | | | | | 0.42 |
| | | 520-1 | 4 | 1 | | 0.25 | |
| | | 520-2 | 6 | 1 | | 0.17 | |
| | L | | | | | | 0.20 |
| | | 520-1 | 5 | 1 | | 0.20 | |
| 1816 | *M* | | | | | | *0.17* |
| | | 520-1 | −6 | 1 | | 0.17 | |
| | | 520-3 | −4 | 0 | X | | |
| | N | | | | | | 0.50 |
| 1816 | | 520-4 | 1 | 2 | | 0.50 | |
| | *O* | | | | | | *0.00* |
| | | 520-3 | −6 | 0 | X | | |
| | P | | | | | | 0.37 |
| | | 520-2 | −5 | 1 | | 0.20 | |
| | | 520-4 | −3 | 2 | | 0.17 | |
| | Q | | | | | | 0.25 |
| 1816 | | 520-2 | 4 | 1 | | 0.25 | |
| | *R* | | | | | | *0.25* |
| | | 520-3 | −1 | 0 | X | | |
| | | 520-4 | 2 | 2 | | 0.25 | |
| | S | | | | | | 0.33 |
| | | 520-2 | −4 | 1 | | 0.25 | |
| | | 520-4 | 6 | 2 | | 0.08 | |
| | T | | | | | | 0.25 |
| | | 520-4 | −2 | 2 | | 0.25 | |
| | U | | | | | | 1.17 |
| | | 520-2 | 1 | 1 | | 1.00 | |
| | | 520-4 | 3 | 2 | | 0.17 | |
| | V | | | | | | 0.70 |
| | | 520-2 | 5 | 1 | | 0.20 | |
| | | 520-4 | −1 | 2 | | 0.50 | |
| | W | | | | | | 0.50 |
| | | 520-2 | 2 | 1 | | 0.50 | |
| | X | | | | | | 0.13 |
| | | 520-4 | 4 | 2 | | 0.13 | |

FIG. 18B

SYSTEMS, METHODS, AND COMPUTER READABLE MEDIA FOR MAINTAINING RECOMMENDATIONS IN A MEDIA RECOMMENDATION SYSTEM

CROSS REFERENCE TO RELATED APPLICATIONS

This application claims the benefit of U.S. Provisional Patent Application No. 61/554,102, filed Nov. 1, 2011, and titled METHOD AND SYSTEM FOR GENERATING RECOMMENDATIONS FROM OTHER USERS CURRENTLY PLAYING THE SAME MEDIA ITEM, the content of which is hereby incorporated herein by reference in its entirety. Further, this application is related to co-pending U.S. Utility patent application Ser. No. 13/666,808, filed simultaneously herewith and titled SYSTEMS, METHODS, AND COMPUTER READABLE MEDIA FOR GENERATING RECOMMENDATIONS IN A MEDIA RECOMMENDATION SYSTEM, and U.S. Utility patent application Ser. No. 13/666,819, filed simultaneously herewith and titled SYSTEMS, METHODS, AND COMPUTER READABLE MEDIA FOR SELECTING A PLAYHEAD IN A SOCIAL MEDIA PLAYBACK SYSTEM, all of which are hereby incorporated herein by reference in their entireties.

TECHNICAL FIELD

The present disclosure relates to playback of media items. Particularly, the present disclosure relates to generating recommendations for playback of media items.

BACKGROUND

Playing media items using network connected computing devices has gained popularity in today's society. Internet-based music service providers, such as Last.fm Ltd. and Spotify Ltd., have popularized the practice of providing real-time playback status information of users to a central server, central system, or other computing device. The service may then analyze the information and use it for recommending music to other users.

Currently-available music recommendation systems have made use of co-occurrence information within media sets to develop high-quality recommendation systems. Example systems include Apple Inc.'s ITUNES® GENIUS® service, and before that Strands, Inc.'s media recommender service. Using the ITUNES® GENIUS® service as an example, a central system collects information about the media collections of multiple users, and the service has access to a large and rich data set. The system then proceeds to analyze each user collection, and counts each time two media items occur within each collection. When analyzed over a large number of collections, information is produced that indicates the likelihood of a second media item being present, given the presence of a first media item. This relationship may also be referred to as the affinity between the two items. An enhancement to this algorithm includes assigning a higher bond between two media items occurring within a user created playlist within a collection, versus just occurring within the same collection. Basically, if two items occur within the same collection, it may be reasoned that they are related in some way (i.e., the same user likes both media items enough to own them). Likewise, if a user went through the effort of creating a custom playlist containing two media items, then they must be highly related.

It is desired to provide improved techniques and systems for generating music recommendations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

As used herein, the term "candidate media item" can refer to media items selected for consideration, scoring, and/or possible recommendation. Not all candidate media items become recommended media items. In an example, a candidate media item may be removed from consideration because the user has recently played it. In another example, a candidate media item may also be removed from consideration because the requesting user has blocked the song, artist, contributing user, geographic location, or other media item attribute corresponding to the candidate media item. Further, for example, a candidate media item may not be used as a recommended media item simply because it ranks low after scoring, and/or does not meet a scoring threshold.

Disclosed herein are methods and systems for generating media item recommendations. According to an aspect, a method may include using at least a processor and memory of a computing device for obtaining play schedules associated with a plurality of other computing devices, the other computing devices currently playing or having recently played a reference media item. From the play schedules, candidate media items are chosen. Candidate media items may be a smaller group of media items that can be selected for recommendation to a user. The method may also include determining recommendation scores for the candidate media items. Further, the method may include generating a media item recommendation for one or more other computing device based on the recommendation scores.

As used herein, the term "playhead" is used to indicate the play position of a user of a computing device on a position scrollbar. The playhead may be represented through graphics, text, or any combination thereof. The playhead may contain other information about the user of the computing device including profile information comprising gender, geographic location, geographic proximity, group affiliations, demographics, age, influence rating, appearance history, favorite artist, favorite song, favorite entertainer, computing device type, play state status, and the like. The playhead may also display information relating to the play schedule of the user corresponding to the computing device, the play schedule comprising future media items to be played and past media items played.

According to another aspect, a method of determining a list of playheads for a media item may include using at least a processor and memory at a computing device for playing a media item. The method may include determining a plurality of other computing devices that are currently playing the same media item. Further, the method may include determining a plurality of intervals for display of playheads corresponding to the other computing devices on a playhead scrollbar. The method may also include selecting an optimal other computing device for at least one of the plurality of intervals. Further, the method may include displaying a playhead corresponding to the optimal other computing device on the playhead scrollbar.

According to yet another aspect, a method includes using at least a processor and memory for obtaining a play instance identifying a media item and a corresponding timestamp indicating when the media item was played. The method also includes associating the play instance with a plurality of play instances associated with the media item. In response to determining that an update criteria has been satisfied the method further includes executing an update function to determine updated media item recommendations. The method also includes storing the updated media item recommendations in a recommendation list for future use.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings:

FIG. 1 is a block diagram of an exemplary computing environment for generating media item recommendations in accordance with embodiments of the present disclosure;

FIG. 4B is a block diagram of example structures of play histories in accordance with embodiments of the present disclosure;

FIG. 6B is a graphical representation of another example media item schedule of multiple users on a position scrollbar in accordance with embodiments of the present disclosure;

FIG. 7A is a diagram depicting example timing of state queries in accordance with embodiments of the present disclosure;

FIG. 7B is another diagram depicting example timing of state queries in accordance with embodiments of the present disclosure;

FIGS. 8A and 8B illustrate a timing diagram of network communications in accordance with embodiments of the present disclosure;

FIGS. 18A and 18B set forth exemplary computation of recommendation scores according to embodiments of the present disclosure;

DETAILED DESCRIPTION

Figure 2A:
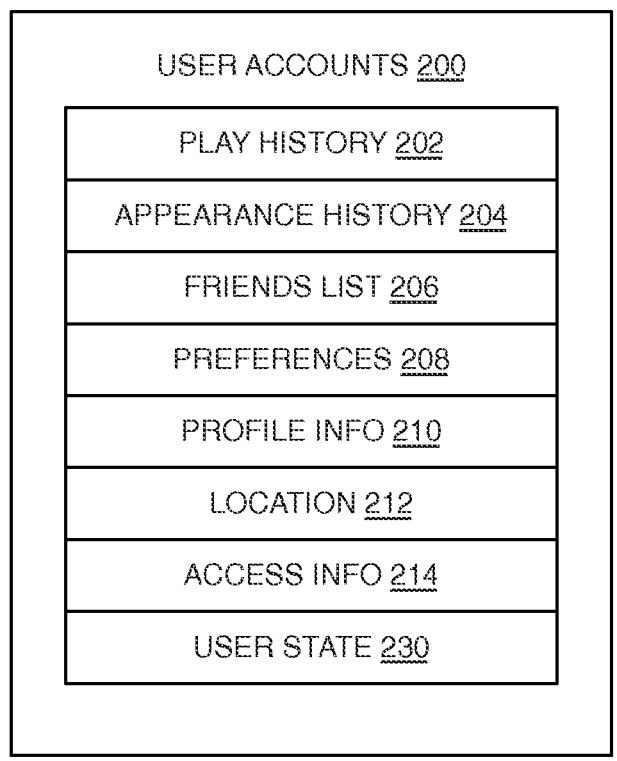
FIG. 2A is a block diagram of an example structure of a user accounts database in accordance with embodiments of the present disclosure.

The presently disclosed subject matter is described with specificity to meet statutory requirements. However, the description itself is not intended to limit the scope of this patent. Rather, the inventor has contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of mobile device, for example, a smart phone, a cell phone, a pager, a personal digital assistant (PDA, e.g., with GPRS NIC), a mobile computer with a smart phone client, a portable media player device, a mobile gaming device, a tablet computer, a handheld computer, a laptop computer, set-top box, Internet radio, A/V network receiver, or the like. A computing device can also include any type of conventional computer, for example, a desktop computer or a laptop computer. A typical mobile device is a wireless data access-enabled device (e.g., an iPHONE® smart phone, a BLACKBERRY® smart phone, a NEXUS ONE™ smart phone, an iPAD™ device, Samsung Rogue smart phone, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device.

As referred to herein, an "interface" is generally a system by which users interact with a computing device. An interface can include an input for allowing users to manipulate a computing device, and can include an output for allowing the system to present information and/or data, indicate the effects of the user's manipulation, etc. An example of an interface on a computing device (e.g., a mobile device) includes a graphical user interface (GUI) that allows a user to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. The display object can be displayed on a display screen of a mobile device and can be selected by and interacted with by a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or arrow keys for moving a cursor to highlight and select the display object.

As referred to herein, a "media item" is generally any type of content that may be played by a computing device. For example, a media item may be audio (e.g., music), video, or any combination thereof. Media items may be communicated between computing devices and may be in any suitable format.

Operating environments in which embodiments of the present disclosure may be implemented are also well-known. In a representative embodiment, a computing device, such as a mobile device, is connectable (for example, via WAP) to a transmission functionality that varies depending on implementation. Thus, for example, where the operating environment is a wide area wireless network (e.g., a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the present disclosure may be implemented in other and next-generation mobile networks and devices as well. The mobile device is the physical equipment used by the end user, typically a subscriber to the wireless network. Typically, a mobile device is a 2.5G-compliant device or 3G-compliant device (or 4G-compliant device) that includes a subscriber identity module (SIM), which is a smart card that carries subscriber-specific information, mobile equipment (e.g., radio and associated signal processing devices), a user interface (or a man-machine interface (MMI)), and one or more interfaces to external devices (e.g., computers, PDAs, and the like). The mobile device may also include a memory or data store.

The presently disclosed subject matter is now described in more detail. FIG. 1 illustrates a block diagram of an exemplary computing environment for generating media item recommendations in accordance with embodiments of the present disclosure. Referring to FIG. 1, a central system 100 may be communicatively connected to computing devices 50 (i.e., computing devices 50-1, 50-2, 50-3 . . . 50-N) via one or more networks 20. The central system 100 may include a control system 102 having a user information broker 104, a tracker information broker 106, and a media broker 108. The user information broker 104 may manage and store data relating to users of the central system 100. For example, the user information broker 104 may store such data in a user accounts database 200. Users may include, but are not limited to, persons who are operating the computing device 50 or who have previously operated the computing device 50. The tracker information broker 106 may maintain tracker information 400 describing a currently playing media item and a current position within the media item. The tracker information 400 may be stored on a server, such as central system 100 shown in FIG. 1, or another computing device, such as one of computing devices 50 shown in FIG. 1. The media broker 108 may be operable with a media repository 300 and may provide access to media items playable within the computing environment. A media item may be, for example, but not limited to, audio (e.g., music), video, or any combination thereof. The functions of the central system 100 may be implemented in software, in hardware, in firmware, or in any combination thereof. The central system 100 may be implemented as a single server, or any number of computers or servers comprising a server farm. The server(s) and/or computer(s) of the central system 100 may be located either at the same network location or at various different network locations distributed throughout the network(s) 20.

A user may interact with the central system 100 by use of one of the computing devices 50. In an example, a computing device 50 may communicate with the central system 100 using the Internet, any other suitable communications network, or combinations thereof. Standard web protocols such as HTTP may be used to facilitate network traffic as described herein, such as in the examples of FIGS. 8A and 8B. Referring to computing device 50-1 for example, the computing device 50-1 may include a control system 51-1 comprising a registration/login/authentication (RLA) function 52-1, a media playback function 54-1, a user interface (UI) handler 60-1, an interface 55-1, and a data store (or memory) 57-1. Computing devices 50-2, 50-3 . . . 50-N may include the same or similar functions having the same or similar features. The RLA function 52-1 may control the interface (e.g., a display) 55-1 for allowing the user to register with the central system 100 and to create a user account for storage in the user accounts database 200. In an example, information regarding users may be obtained from or augmented with data obtained from a social network or from other computing devices, such as computing devices 50-2 and 50-3.

As used herein, the term "social network" may be used to describe any system operating to provide a user of the system the ability to express reciprocal friend relationships with other users of the system. An example of a social network is any of the social networks maintained by the FACEBOOK® social network service.

As used herein, the term "social distance" may be used to describe the number of hops required to reach another user of the system. For example, a friend can have a social distance of one. A friend of a friend can have a social distance of two.

As used herein, the term "social graph" may be used to identify the relationships possessed by a single user. External services, such as services described in this disclosure, may obtain information regarding a user of a social network using an application programming interface (API) for external developers. In the example of the FACEBOOK® social network service, this external API is called Facebook Connect.

The media playback function 54-1 may operate to provide playback of a media item. The media playback function 54-1 may communicate to the central system 100 information specifying a currently playing media item and a current playback position within the media item. For example, the media playback function 54-1 may control an input/output component of the computing device 50-1 to communicate to a state tracking function 56-1 a media item identifier (ID) and an identifier of the current playback position of the media item. The media playback function 54-1 may periodically communicate such state information to the state tracking function 56-1 for storage within the tracker information database 400. The state tracking function 56-1 may also update information within the tracker information database 400. Further, the state tracking function 56-1 may communicate to the computing device 51-1 similar user state information obtained from other computing devices 50. For example, such state information may be obtained from other computing devices, such as computing device 50-2 or 50-3, currently playing media items having the same media item ID as the requesting computing device 50-1 along with the corresponding user state information for each respective computing device 50. A next media item selection function 58 may include logic for selecting a next media item for playback. In an example, the logic of the next media item selection function 58 is executed at the central system 100, and the results are provided to a computing device 50.

Those of ordinary skill in the art will appreciate that the network(s) 20 is not limited by the aspects listed above. More specifically, the network(s) 20 may be one or more of any type of network suitable to allow interaction between the computing devices 50 and the central system 100. For example, the network(s) 20 may be a wired network, a wireless network, or any combination thereof. Further, the network(s) 20 may include a distributed computing network, an intranet, a local-area network (LAN) and/or a wide-area network (WAN), or any combination thereof.

FIG. 2A illustrates a block diagram of an example structure of a user accounts database 200 in accordance with embodiments of the present disclosure. The user accounts database 200 may be stored on a server, such as central system 100 shown in FIG. 1, or another computing device, such as one of computing devices 50 shown in FIG. 1. Referring to FIG. 2A, the user accounts database 200 may include information associated with users of the computing environment depicted in FIG. 1. A play history field 202 may include information identifying media items being played by a respective user. For example, information contained in the play history field 202 may identify the title, type, and timestamp of time played of the media item. An appearance history field 204 may include information identifying occurrences where the respective user 10 appeared as another user on a position scrollbar (e.g., described with respect to the example of FIG. 4A). This information may also contain a user ID of the user whose position scrollbar (e.g., described with respect to the example of FIG. 4A) included the user, a timestamp of the occurrence, and an indication of whether the user was followed.

A friends list field 206 may include one or more identifiers for identifying other users of the system with which the user has a relationship. In an example, a friend may be another user with which the user successfully completed an invitation response protocol within a social network environment. Further, the friends list may include identifiers of computing devices of the other users.

A preferences field 208 may include information about preferences of the user. The preferences information may be used for various customizations pertaining to the operation of the disclosed systems and methods. Examples of preferences may include display colors, display fonts, startup preferences, media item genre, evaluation interval settings, and/or the like.

A profile information field 210 may include information regarding the user. This information may include age, gender, birthday, demographic information, race, ethnicity, political affiliation, clubs, awards, and/or the like.

A location field 212 may include information indicating the location of user 10. In an example, this field may include identification of the last known location of the user. In another example, this field may include a history of locations and timestamps.

An access information field 214 may include information representing which other users and applications may make use of various stored information regarding the user. For example, the user may choose to make all his/her information public, grant access only to friends, only to certain friends or list of users, and/or the like.

A user state field 230 may include information representing an activity of a user currently playing back a media item. For example, user state information may include an identifier uniquely identifying a computing device within the system. In another example, user state information may include an identifier identifying a user within the system. Further, for example, user state information may include media item schedule information and/or other information as disclosed herein regarding a user's state.

As used herein, the term "state query" is used to refer to a process of a computing device transmitting a user's identification information and currently playing media item identifier to a central system or other computing device. In response, the central system may transmit to the computing device a list of other users currently playing the same media item, along with the corresponding next media item to play information for each other user.

Figure 2B:
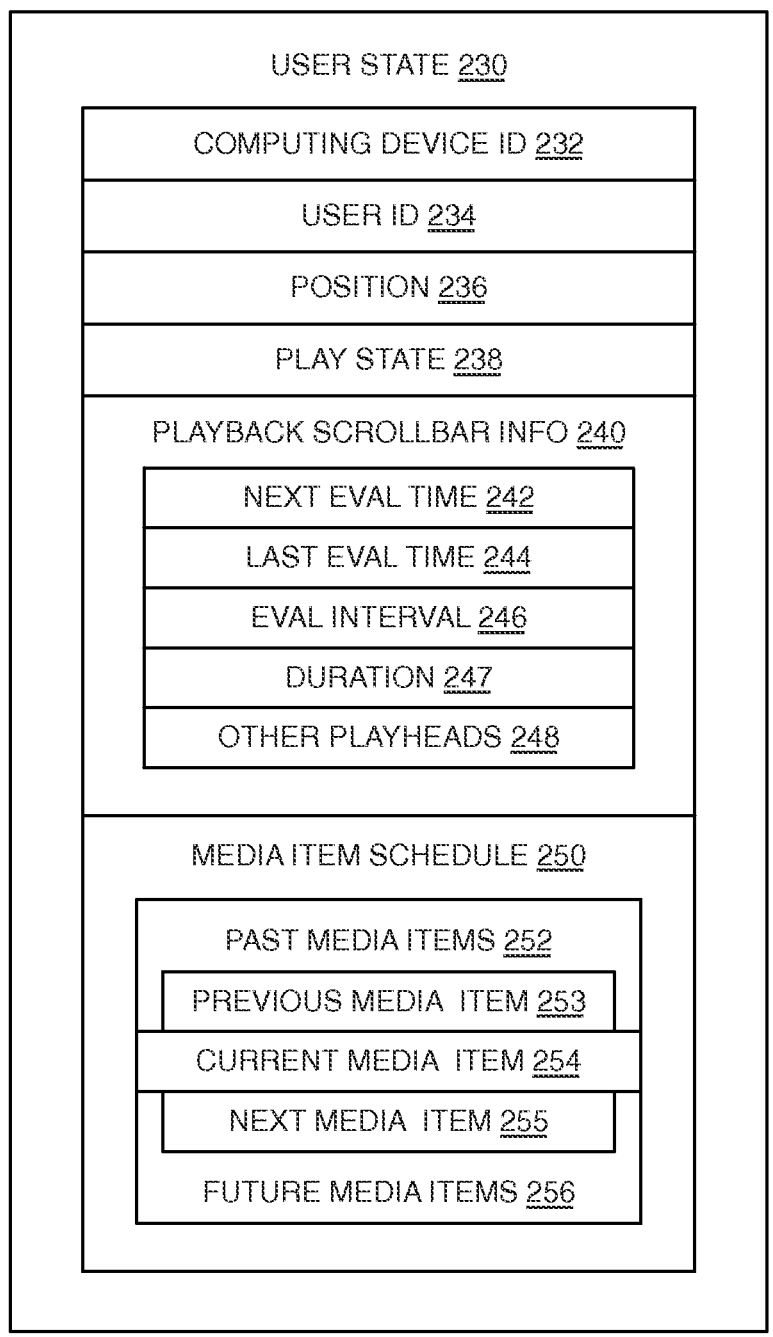
FIG. 2B is a block diagram of an example structure of a user state field in accordance with embodiments of the present disclosure.

FIG. 2B illustrates a block diagram of an example structure of a user state field 230 in accordance with embodiments of the present disclosure. The user accounts database 200 may be stored on a server, such as central system 100 shown in FIG. 1, or another computing device, such as one of computing devices 50 shown in FIG. 1. Referring to FIG. 2B, the user state field 230 may include information representing the activity of users currently playing back a media item corresponding to a media item ID. The user state field 230 includes a computing device ID 232 which is an identifier uniquely identifying a computing device, such as computing device 50-1. In an example, the computing device ID 232 is a MAC address of the computing device, such as computing device 50-1. Further, the user state field 230 includes a user ID 234 which is a unique identifier identifying a user. In an example, the user ID 234 may be a username or login for the user within a social network. A current position 236 may indicate the playback position of the user within the media item associated with the media item ID. A play state 238 may indicate the current state of playback of the media item associated with the media item ID. Examples of play state 238 may include paused, stopped, playing, forwarding, reversing, and the like. A media item schedule 250 may include past media items 252. The past media items 252 may contain a previous media item field 253 including information identifying the media item that was previously played by the user. Current media item 254 may contain information identifying the media item currently being played by the user. Future media items 256 may indicate one or more next items to be played by the corresponding user.

Next media item 255 may identify the media item ID that will be played for the user at the end of the current media item 254. This information may also include the user(s) that were playing the same media item ID and contributed to its selection. A last evaluation time may represent the last time that the logic was successfully executed to determine the next media item 255 to play. Reasons for failure might include network failure, network latency, user starvation (e.g., instance where a user is denied a resource), and the like.

Playback scrollbar information 240 may include next evaluation time 242, which may represent the scheduled time when the next media item 255 determination logic will be executed. Last evaluation time 244 may represent a scheduled time when the previous media item 253 was executed. Evaluation interval 246 may represent the interval between next media item selection attempts. This may be expressed in terms of a time interval, a divisor by which a duration 247 of the media item ID is divided to arrive at the evaluation interval 246. In an example, the next media item 255 determination is performed only twice: once at the start of the media item, and again later in the playback of the media item. Playback scrollbar information 240 may also include other playheads 248 A playhead may be an indicator of a current play position within a media item. For example, a playhead may be a displayed icon or line that indicates a relative position of play within some other indicia (e.g., a displayed bar) of the total play time of a media item.

Figure 3:
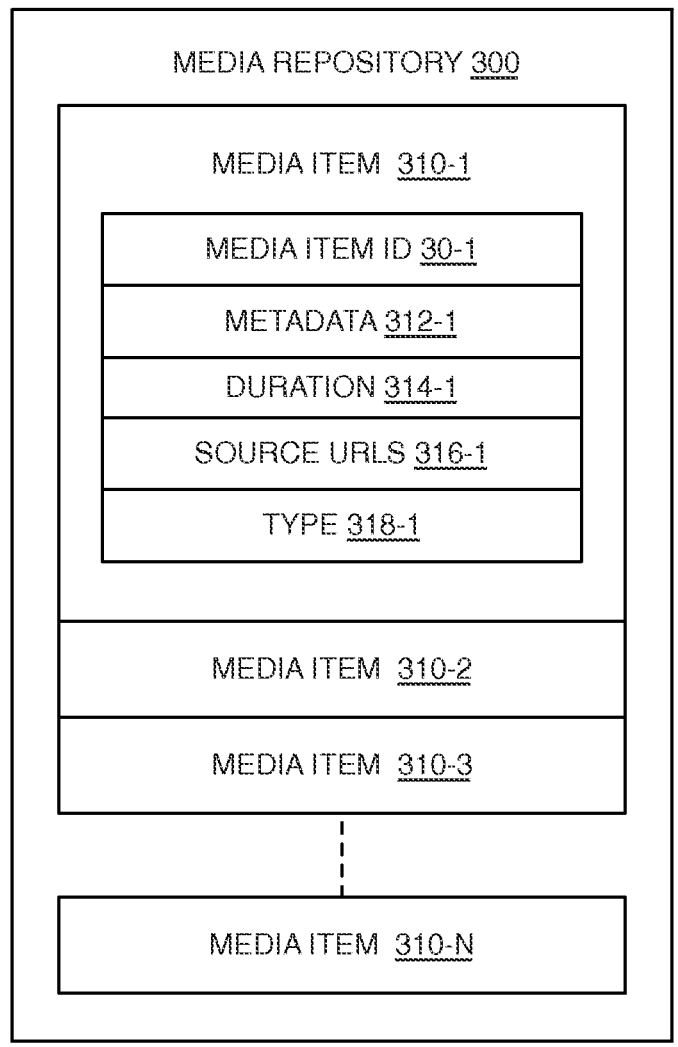
FIG. 3 is a block diagram of an example structure of a media repository in accordance with embodiments of the present disclosure.

FIG. 3 illustrates a block diagram of an example structure of a media repository 300 in accordance with embodiments of the present disclosure. The media repository 300 may be stored on a server, such as central system 100 shown in FIG. 1, or another computing device. Referring to FIG. 3, the media repository 300 may store data operated on by a media broker, such as the media broker 108 shown in FIG. 1. The media repository 300 may include one or more media items 310 (e.g., media items 310-1, 310-2, 310-3 . . . 310-N). Each media item 310 may include a media item ID 30 (e.g., media item ID 30-1), metadata 312 (e.g., metadata 312-1) describing the item, a duration 314 (e.g., duration 314-1) of the media item, source URLs 316 (e.g., source URLs 316-1), and type 318. The media item ID 30-1 may be an identifier uniquely identifying the media item within the system. The metadata 312-1 field may contain information about the media item such as, for example, title, artist, producer, year of release, studio, performers, and/or the like. The duration 314-1 is the time duration in seconds of the media item. The source Uniform Resource Locators (URLs) contain information identifying the location of the media item. Type 318-1 may indicate the data type of the media item. Example media items include audio, video, or any combination of audio and video. The source of the media may be a media repository controlled by the media broker 108, media stored at the device, user media stored in the cloud and made available to the computing devices, subscription services, or any combination of these sources. The media broker 108 may provide an identification and translation function whereby the same media item may be correctly identified throughout the system.

Figure 4A:
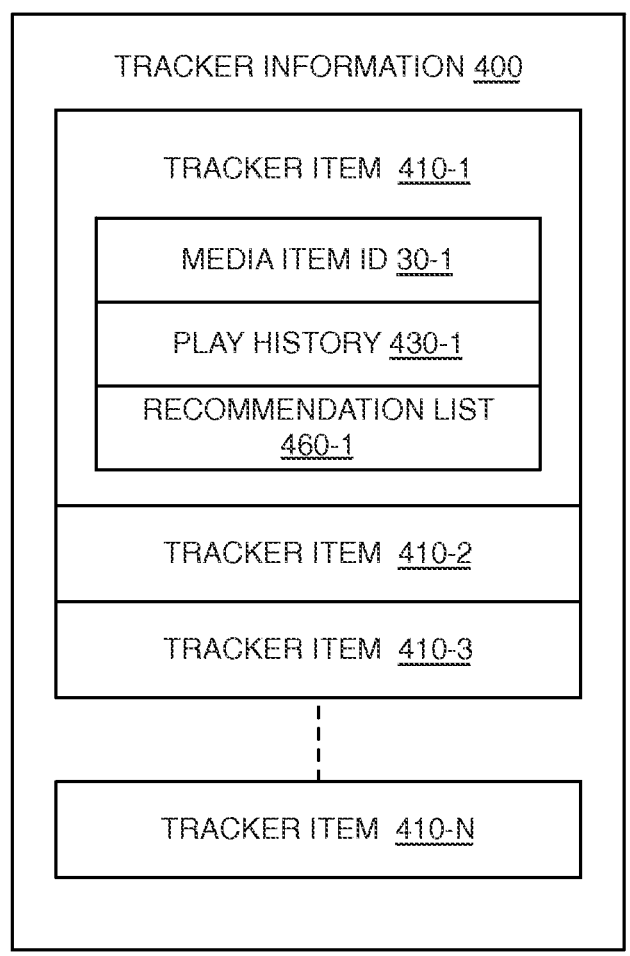
FIG. 4A is a block diagram of an example structure of tracker information data in accordance with embodiments of the present disclosure.

FIG. 4A illustrates a block diagram of an example structure of tracker information data 400 in accordance with embodiments of the present disclosure. The tracker information data 400 may be stored on a server, such as central system 100 shown in FIG. 1, or another computing device. Referring to FIG. 4A, the media broker 108 may store state information in the tracker information 400. The structure may include multiple tracker items 410, such as tracker items 410-1, 410-2, 410-3 . . . 410-N. Each tracker item 410 may correspond to a media item and may include a media item ID, such as media item ID 30-1. Further, each tracker item 400 may include a play history 430, such as play history 430-1, and a recommendation list 460, such as recommendation list 460-1.

FIG. 4B illustrates a block diagram of example structures of play histories 430-1, 430-2 . . . 430-N in accordance with embodiments of the present disclosure. Referring to FIG. 4B, the play history 430-1 may include a count 432-1 and one or more play instances 450-1 . . . 450-N. Each play history instance 450 corresponds to an instance in which a media item was played by a user 10. The play instance may include a timestamp 12 indicating a play time and a geographic location 14 at which the media item associated with the media item ID 30 was consumed. A media item may be treated as played by the system in a number of different manners. For example, the play instance may indicate that play of the media item started, that a percentage of the content of the media item was played, and/or that the entirety of the media item was played. The timestamp may be assigned by the computing device playing the media item, or it may be assigned at a central system or other computing device. The most recently played media items are represented at the top, and the least recently played media items are represented at the bottom.

Figure 4C:
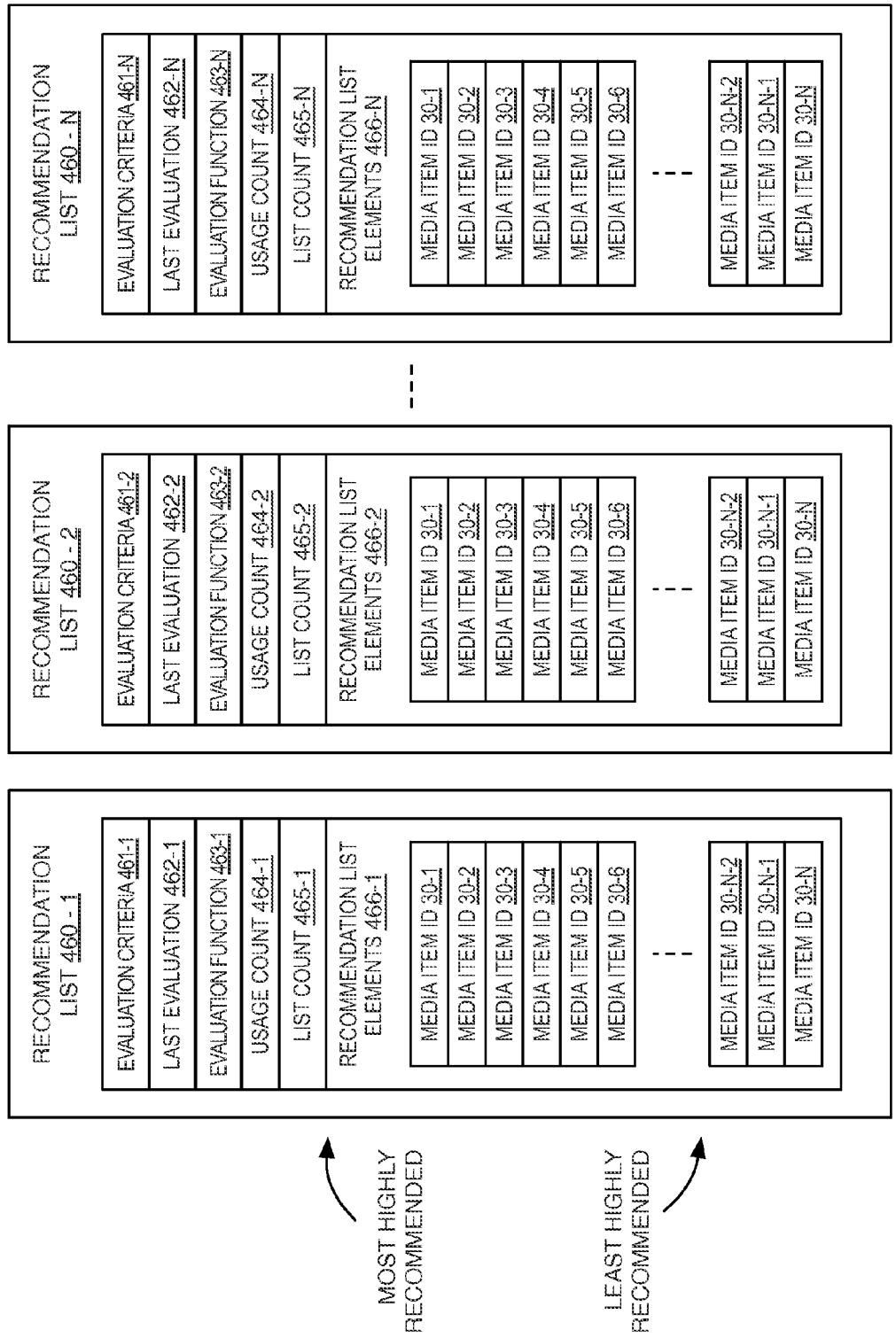
FIG. 4C illustrates a block diagram of example structures of recommendation lists in accordance with embodiments of the present disclosure.

FIG. 4C illustrates a block diagram of example structures of recommendation lists 460-1, 460-1 . . . 460-N in accordance with embodiments of the present disclosure. Referring to FIG. 4C, the recommendation list 460 may be computed based on the play history 430. An evaluation criteria 461 and evaluation function 463, described in further detail herein, may be stored in the list 460. The structure may include a last evaluation 462 (e.g., last evaluations 462-1, 462-2 . . . 462-N), a usage count 464 (e.g., usage counts 464-1, 464-2 . . . 464-N), a list count 465 (e.g., list counts 465-1, 465-2 . . . 465-N), and recommendation list elements 466 (e.g., recommendation list elements 466-1, 466-2 . . . 466-N). Last evaluation 462 may store information indicating the time when the last recomputation of the recommendation list elements 466 occurred. Usage count 464 may indicate how many times the recommendation list elements 466 have been accessed. List count 465 may indicate the number of media items 30 (e.g. media items 30-1, 30-2 . . . 30-N) present in the recommendation list elements 466.

Figure 5A:
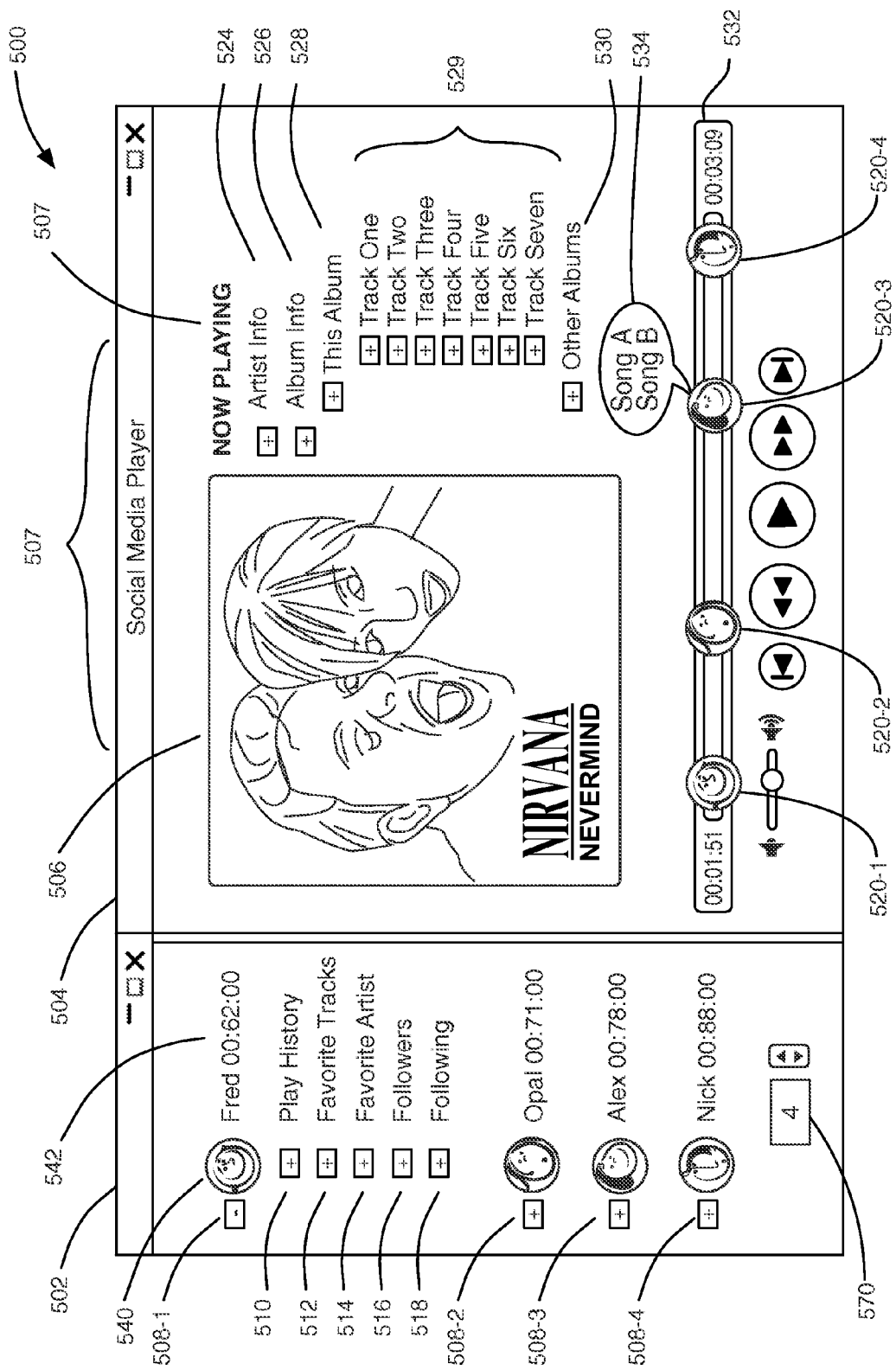
FIGS. 5A and 5B are screen displays of user interfaces of a social media player in accordance with embodiments of the present disclosure.
Figure 5B:
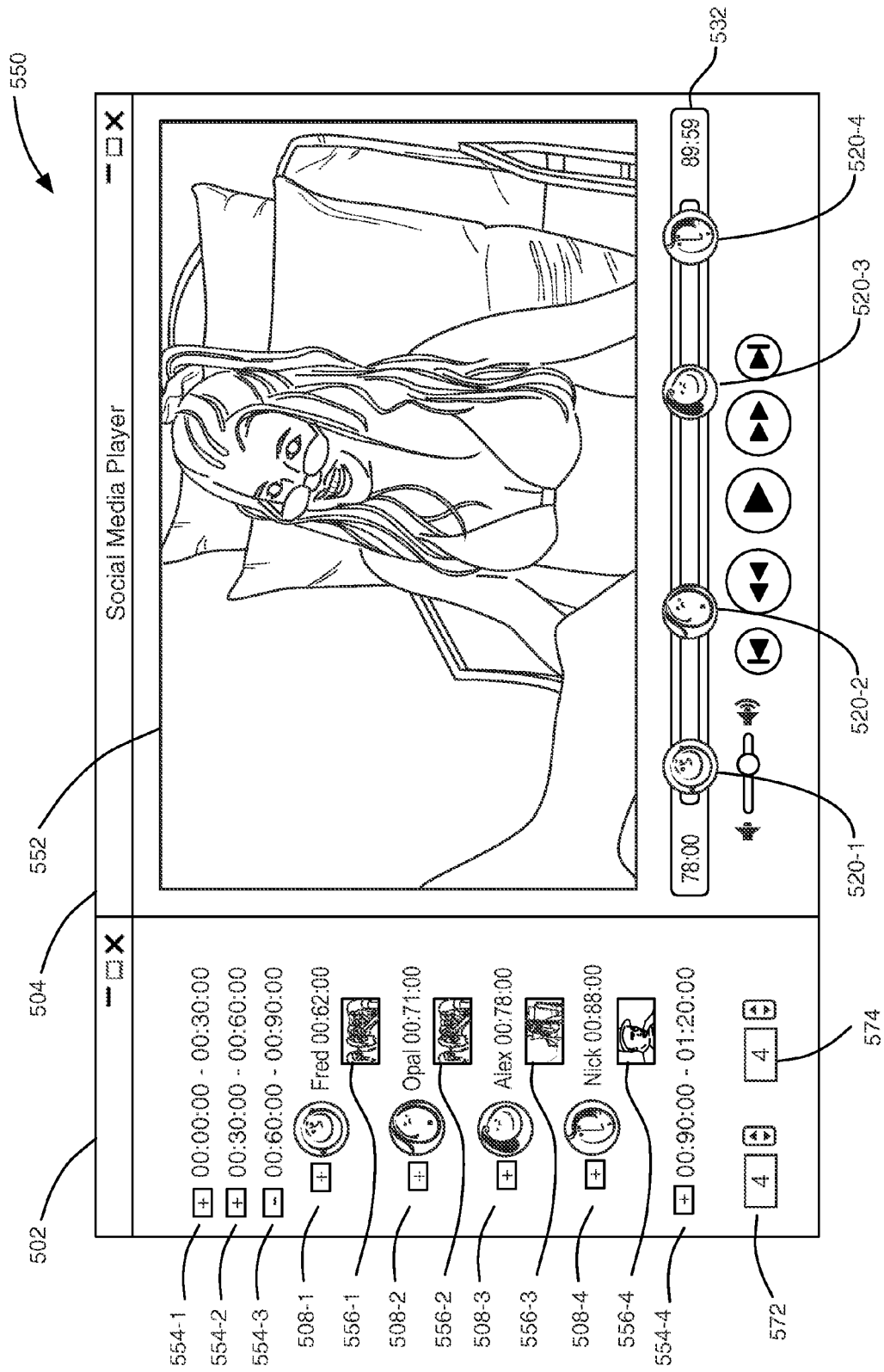

FIGS. 5A and 5B illustrate screen displays of user interfaces 500 and 550, respectively, of a social media player in accordance with embodiments of the present disclosure. The user interface shown in FIG. 5A is configured for playing back a song. The user interface shown in FIG. 5B is configured for playing video. Referring to FIG. 5A, the user interface 500 includes a user information pane 502, a media pane 504, and a current song position scrollbar 532. The current song position scrollbar 532 includes social playheads 520 (e.g., playheads 520-1, 520-2, 520-3, and 520-4) for other users currently playing the same media item. The current song position scrollbar 532 contains one social playhead for the user of the application 520-3, one or more trailing playheads 520-1 520-2, and one or more leading playheads 520-4. The playheads 520 may each include media item schedules (e.g., schedule 534) indicating the next songs to be played for the respective playhead. A number may be displayed within box 570 for indicating a number of playheads that are displayed. The selector adjacent box 570 may be used for changing the number of playheads to display on the scrollbar 532.

The user pane 502 may operate to display a hierarchical information menu wherein the top level menu items of the hierarchical information menu corresponds to the social playheads 520 currently appearing on the position scroll bar 532. In this particular figure, only menu 508-1 is in an expanded state. Menu items 508-2, 508-3, 508-4, 510, 512, 514, 516, and 518 are all in their contracted states. The social playhead menu items 508 may include the social playhead 540 and position indicator 542. Selection of a menu item (e.g., media items 508-1, 508-2, 508-3, and 508-N) may cause additional information regarding the user to be displayed. The additional information displayed may include play history information 510, favorite track information 512, favorite artist information 514, follower information 516, and followee information 518. Selection of the play history information 510 menu item may effect the presentation of information stored in the play history 202 field of a user account database, such as the user account database 200 shown in FIG. 2A. The information displayed by the favorite tracks information 512 menu item and the favorite artist information 514 menu item may be determined from an analysis of the play history 202. The information displayed in the followers information 516 menu item and followee information 518 menu item may be stored in a friends list 206, such as the friends list 206 shown in FIG. 2A.

The media player pane 504 may include a media information area 507 and the position scrollbar 532. The media information area 507 may also include a cover art display area 506 and a hierarchical information menu wherein the top level menu items of the hierarchical information menu corresponds to metadata for the currently playing media item 254. An artist information 524 menu item may operate to display information about the artist of the currently playing song. The album information menu item 526 may display information regarding the album from which the current song is playing, as well as other tracks 529 from the same album. Information describing other albums 530 from the same artist may also be displayed.

In accordance with embodiments of the present disclosure, a next song to play for a user may be determined by selecting the most frequently occurring next song from among other users. This determination may be made at any time before the user reaches the end of playback of the current media item. This determination process may occur only once, or it may occur multiple times. Those of ordinary skill in the art will recognize that many variations are possible in terms of algorithms for selecting a next media item to play. These variations should be considered within the scope of the present disclosure.

In an example, the media player pane may show, by default, information related to the currently playing media item. Alternatively, this information may not be shown by default. The user may select other media items for which to display information by selecting any song appearing in any upcoming media item list of any other user. In an example, the information shown in the song information pane 506 may include album art and metadata relating to the song. Unless otherwise configured, the media item described in the media player information pane may revert back to a current media item at the start of each new media item.

The media pane 504 may display information for a selected user. The selected user may be the current user, or any user displayed as a playhead. As the user selects a playhead 520 by clicking on it or using other such selection means, the media pane 504 may update to display information for that specific user. In an example, the information shown in the media pane 504 can be comprised of the user's profile image and metadata relating to the user.

Referring to FIG. 5B, the user interface 550 includes the user information pane 502, the media pane 504, and the current video position scrollbar 532. The current video position scrollbar 532 includes social playheads 520 (e.g., playheads 520-1, 520-2, 520-3, and 520-4) for other users currently playing the same video. The user information pane 502 may operate to display a hierarchical information menu wherein the top level menu items of the hierarchical information menu corresponds to time periods 554 (e.g., time periods 554-1, 554-2, 554-3, and 554-4) of a video 552 being played back. Menus 554 and 508 are hierarchical controls operable to show additional information in an expanded view when selected. In this particular figure, only menu 554-3 is in an expanded state. Menu items 554-1, 554-2, 554-4, and 508 are all in their contracted states. A user may interact with the display to select one of the time periods 554 to uncover a corresponding next level of menu items 508 (e.g., media items 508-1, 508-2, 508-3, and 508-4). The menu items 508 may correspond to other users who are at a position within the selected time period within the video 552. Selection of a menu item 508 may cause additional information regarding the user 520 to be displayed. The additional information displayed may indicate a time where the respective user is in playback of the video along with a thumbnail image 556 (e.g., images 556-1, 556-2, 556-3, and 556-4) corresponding to that position in the video 552. A number may be displayed within box 572 for indicating a number of playheads that are displayed. The selector adjacent box 572 may be used for changing the number of playheads to display on the scrollbar 532. Further, a number may be displayed within box 574 for indicating a number of divisions displayed within the scrollbar 532. The selector adjacent box 574 may be used for changing the number of divisions.

Figure 6A:
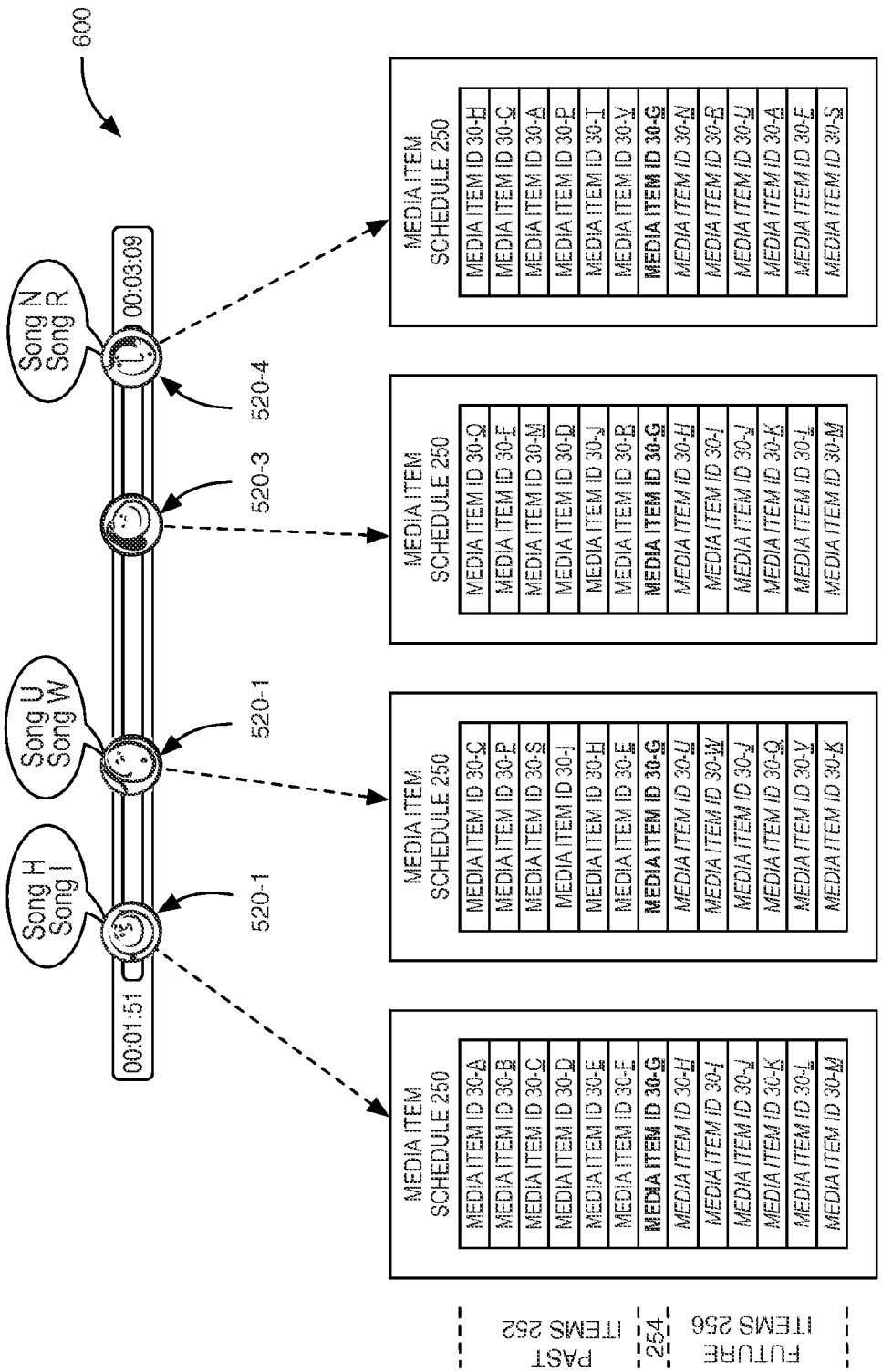
FIG. 6A is a graphical representation of an example media item schedule of multiple users on a position scrollbar in accordance with embodiments of the present disclosure.

FIG. 6A illustrates a graphical representation of an example media item schedule of multiple users on a position scrollbar 532 in accordance with embodiments of the present disclosure. More particularly, FIG. 6A depicts an expanded view of the position of users with respect to the scrollbar 532 currently playing the same song. In this figure, the position scrollbar 532 is shown along with their corresponding media item schedules 250. The media item schedules 250 may include past media items that are generally designated 252, a current media item 254, and next media items 256. In this example, there are four playheads 520 corresponding to four users. Two of the playheads are trailing playheads 520-1 520-2, one of the playheads is a leading playhead 520-4, and one of the playheads is a current playhead 520-3. While only four playheads are shown there may be any number of trailing or leading playheads, but there may be only one current playhead. As a practical matter, there is a limit to how many playheads 520 may be shown on the position scrollbar 532 while remaining intelligible. Trailing playheads 520-1, 520-2, 520-3, and 520-4 may have corresponding media items.

FIG. 6B illustrates a graphical representation of another example media item schedule of multiple users on a position scrollbar in accordance with embodiments of the present disclosure. This figure shows an alternate to the example of FIG. 6A. In this example, representations of music items played by playheads 520-1, 520-2, 520-3, and 520-4 over a period of time are depicted. Music items are represented, for example, by lettered segments along bars 602, 604, 606, and 608 for playheads 520-1, 520-2, 520-3, and 520-4, respectively. FIG. 6B depicts the example of FIG. 6A from a different perspective in which a user may view the media item that each user has listened to, is listening to, or will be listening to with respect to what each of the other users are doing at the same time.

At the current time t=0, all four users associated with playheads 520-1, 520-2, 520-3, and 520-4 are experiencing the same media item, i.e., listening to song G. At the time t=−10, trailing playhead 520-1 was finishing song B, the trailing playhead 520-2 was listening to song S, the leading playhead 520-4 was listening to song A, and following playhead 520-3 was listening to song M. In FIGS. 6A and 6B the example shown has the same number of past media items 252 and future media items 256 for each of the leading 520-4 and trailing users 520-1 520-2, but this need not be the case because each user may have differing numbers of past media items 252 and future media items 256.

In accordance with embodiments of the present disclosure, a computing device corresponding to playhead 520-3 or a central server may determine one or more media items for playback by the computing device associated with playhead 520-3. For example, the computing device or server may obtain or otherwise receive candidate media items from other users recently playing the currently playing media item of the user associated with playhead 520-3. In the example of FIG. 6B, it may be determined that at time t=0 or near a time t=0, playheads 520-1, 520-2, and 520-4 are also playing song G on their respective computing devices. In response to determining that the other playheads are playing the same music or other media item, the computing device or server may determine candidate media items from the others. For example, the computing device or server may determine that the others have played music A and B, and music A and B may be candidates for playback by playhead 520-3. Other candidate media items may be, for example, the music that the others will play. Subsequently, the computing device or server may determine a recommendation score for the candidate music based on an occurrence count of the candidate music with an analysis window. For example, the computing device or server may count the number of occurrences (e.g., number of times the candidate music was played) within a predetermined time period. The recommendation score may be based on the occurrence count for the others within the predetermined time period. Subsequently, the computing device or server may select for playback one or more music items from the group of candidate music based on the recommendation score. For example, the computing device or server may select for playback the music with the highest number of occurrences within the predetermined time period. This music may be set for playback by the computing device associated with playhead 520-3 within a time period (designated by broken line 616).

Referring to FIG. 4C, a media item ID is the unique identifier associated with the media item. Last evaluation is used to track the time at which the recommendations associated with the media item were last computed. Usage count tracks the number of times that the recommendation list 460 has been accessed. There are two parts to the usage count. One counter counts the total number of times the recommendation list 460 has been accessed. Another counter keeps track of the number of times the recommendation has been accessed since the recommendation list was last updated. In one aspect, the recommendation list 460 is maintained in a sort, with the most highly recommended media items at one end of the list, and the least highly recommended media item at the other end of the list. The media item recommendation list 460 may be stored in memory for low latency high throughput access, stored in the file system, or stored in a database. In one aspect, the most frequently accessed recommendation list 460 is maintained in memory, while the less frequently accessed recommendation list 460 is maintained in the file store or database.

FIG. 7A illustrates a diagram depicting example timing of state queries in accordance with embodiments of the present disclosure. Referring to FIG. 7A, state queries 702 (e.g., state queries 702-1, 702-2, 702-3, 702-4 . . . 702-N) may be attempted on a periodic basis based on dividing a duration (e.g., as indicated by duration 247 shown in FIG. 2B) of a media item ID by an evaluation interval, such as evaluation interval 246 shown in FIG. 2B. As part of each state query, a computing device may transmit its user state information (e.g., information contained in the user state field 230 shown in FIG. 2B) to a central system (e.g., the central system 100 shown in FIG. 1), and may receive user state information for zero or more other users' current media item (e.g., as indicated by current media item 254 shown in FIG. 2B). The computing device 50 may subsequently determine a next media item (e.g., next media item 255 shown in FIG. 2B). It is noted that selection of a next media item to play does not necessarily include the initiation of the playback of the next media item. Without user intervention, transition to the next media item may not occur until after the current media item (e.g., current media item 254 shown in FIG. 2B) completes playback. It is noted also that the selection of a next media item occurs as part of each state query, and the selection may conceivably change from one state evaluation to the next, where the next media item actually played ends up being the current next media item to play when the current media item completes playback.

FIG. 7B illustrates a diagram depicting example timing of state queries in accordance with embodiments of the present disclosure. Referring to FIG. 7B, a single state query 752-1 is performed at or near the start of the media item playback, and zero or more user states may be returned. In this example, the second and final state query 752-N may not be initiated until a user selectable percentage of the current media item has completed playback. Subsequently, the next media item to play may be determined, and playback of the next media item may be initiated when the current media item completes playback.

FIGS. 8A and 8B illustrate a timing diagram 800 of network communications in accordance with embodiments of the present disclosure. Referring to FIG. 8A, the computing devices 50-1, 50-2, and 50-N may each communicate a registration message 802 to register with and log in to the central system 100. In an example, the user may log into the central system 100 using account credentials from a user account such as Facebook Connect. Subsequently, as each computing device plays a media item, information identifying the currently playing media item and upcoming media items may be transmitted to the central system 100 via a suitable communication message 804. The central system 100 may maintain data indicating the devices currently playing each media item known to the central system 100, a list of media items played, the currently playing media item, and upcoming media items for each computing device 50 known to the central system 100. Information may be obtained 808 that identifies one or more media items from one or more other computing devices. The central system 100 may subsequently determine, for each computing device 50-1, 50-2, and 50-N, other devices currently playing the same media item 806.

Subsequently, the central system 100 may communicate to each computing device 50, information identifying one or more media items from one or more other computing devices. With the obtained information, the computing devices 50 may each render a timeline with positions of user and other computing device playback positions 810 in accordance with embodiments of the present disclosure. For example, a position scrollbar may be updated to show playheads that indicate playback positions and that identify other computing devices currently playing the same media item. Subsequently, each computing device may select a next song for playback from among the songs currently being played by the other computing devices at step 812. The process may subsequently start over and the computing devices may provide updated current media item and playback position information for the current user 814.

Figure 9:
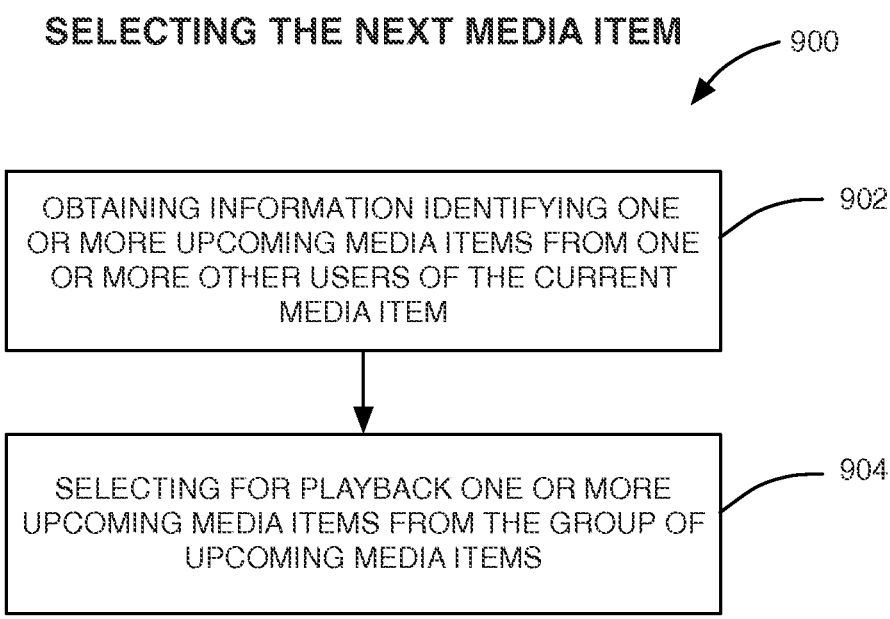
FIG. 9 is a flowchart of an example method of selecting a next media item in accordance with embodiments of the present disclosure.

FIG. 9 illustrates a flowchart of an example method 900 of selecting a next media item in accordance with embodiments of the present disclosure. The method of FIG. 9 may be implemented within any suitable computing device such as one of the computing devices 50 and/or the central system 100. Referring to FIG. 9, the method 900 may include obtaining one or more identifiers of upcoming media items for playback by one or more other users of a current media item (step 902). The media item may currently be played by the computing device. The method 900 may also include selecting for playback one or more upcoming media items from a group of upcoming media items (step 904). These steps may be implemented in accordance with any of the examples disclosed herein.

Figure 10:
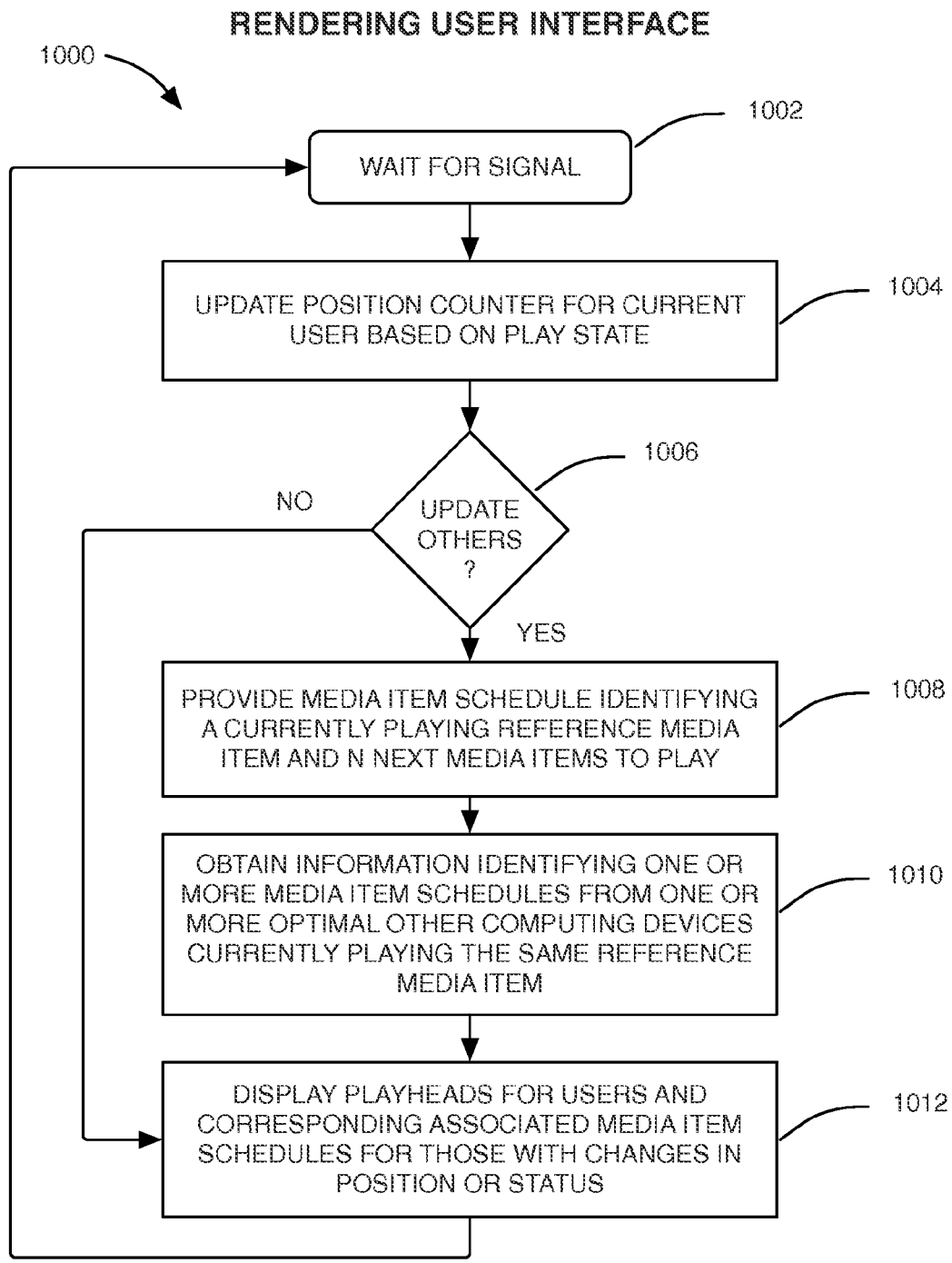
FIG. 10 is a flowchart of an example method of rendering a user interface of a computing device in accordance with embodiments of the present disclosure.

FIG. 10 illustrates a flowchart of an example method 1000 of rendering a user interface of a computing device in accordance with embodiments of the present disclosure. In an example, the method may be implemented by a computing device, such as one of the computing devices 50 shown in FIG. 1, although the method may be implemented by any suitable computing device. As an example, the method may be used for displaying playheads on a display of the computing device where the computing device is playing a media item. As the media item is playing, the control system of the computing device can periodically invoke the program codes implementing the method of FIG. 10 through the use of signals, events, polling, interrupts, or the like (step 1002). Based on the play state of the media item, the playback position for the computing device can be updated to the current position (step 1004). At step 1006, the computing device may determine whether to update positions and media item schedules for other users who are also playing the same media item. In response to determining that the positions and media item schedules of the other users are not to be updated, the computing device may display playheads for users (step 1012). Subsequent to step 1012, the computing device may wait for a next signal before again proceeding to step 1004. The display of playheads may include displaying the playheads and corresponding media item schedules. For example, referring to FIG. 5A, the display shows playheads 520-1, 520-2, 520-3, and 520-4 in respective positions along the scrollbar 532. In addition, the playheads may indicate media item schedules, play state, and the like for the corresponding users.

Now returning to step 1006, the method may subsequently proceed to step 1008 wherein the computing device provides the media item schedule identifying a current playing reference media item and future media items to be played. In one implementation, this information is provided to a central system or server. In another implementation, this information is provided to another module of the same computing device. An example implementation of this step is provided in the method of FIG. 11 described below. At step 1010, a response is received identifying one or more media item schedules from one or more optimal other computing devices currently playing the same reference media item. In one implementation, this information can be obtained from a central system or server. In another implementation, this information is obtained from another module of the same computing device. As further illustration, this information may be received in accordance with the example method of FIG. 11. Also, next media items for the current user may be obtained. The method may then proceed to step 1012. At step 1012, playheads can be displayed for users and corresponding associated media item schedules for those with changes in position. Subsequently, the method may proceed to step 1002 to wait for another signal.

As further clarification, it is noted that computing devices participating within the present system can be either contributing users or following users. Contributing users are those users who are playing content from a media source that is user-determined as opposed to obtained from the present recommendation system. Following users are those users who are playing back a stream of media items selected by the present system. In terms of FIG. 10, this can mean that a computing device will either be providing next media items to play in step 1008 or obtaining next media items to play in step 1010, but not both.

Figure 11:
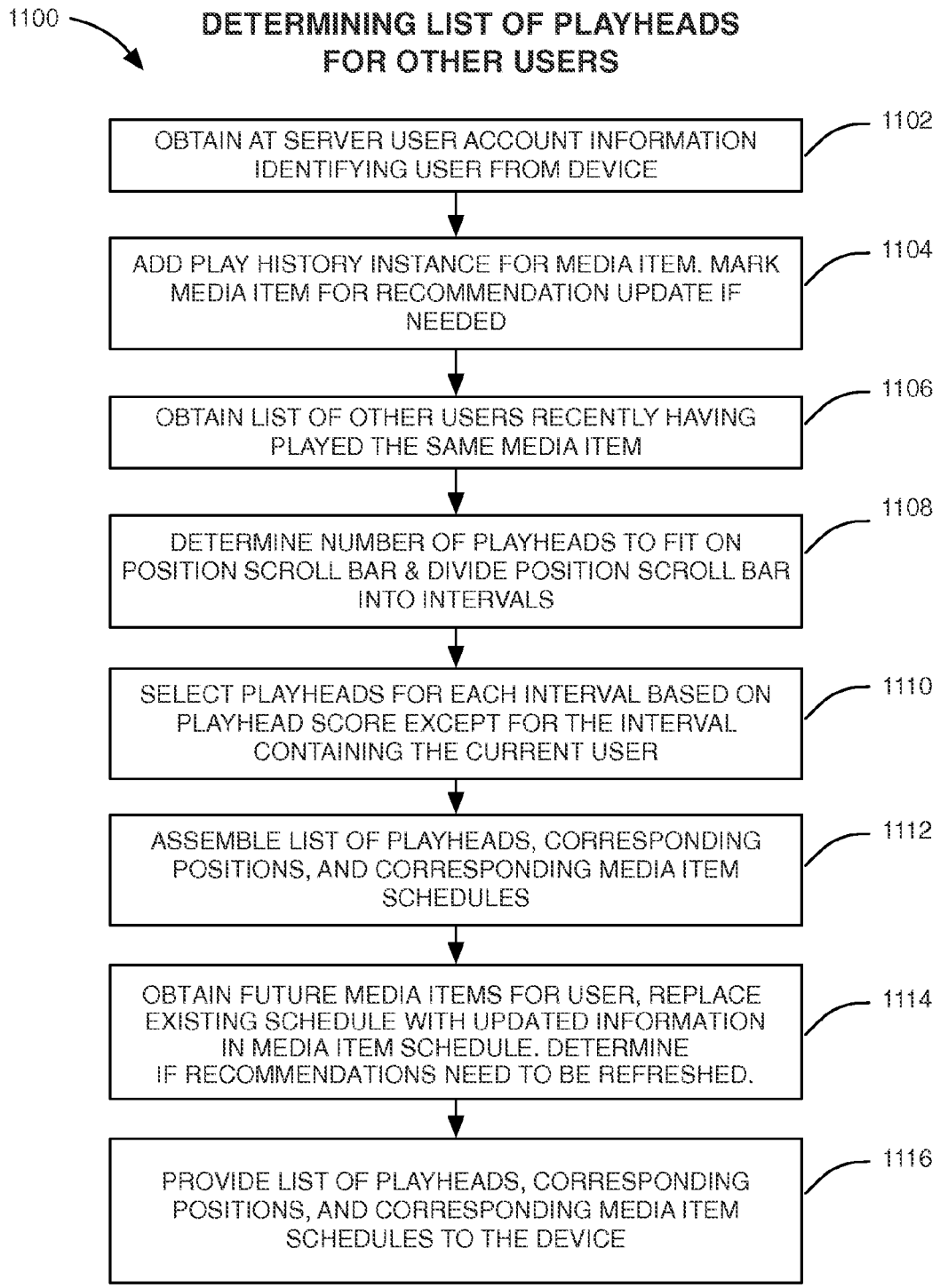
FIG. 11 is a flowchart of an example method of determining a list of playheads for representing other users in accordance with embodiments of the present disclosure.

FIG. 11 illustrates a flowchart of an example method 1100 of determining a list of playheads for representing other users in accordance with embodiments of the present disclosure. The example method may be implemented by a central system or any suitable computing device. In an example, the central system may be a server. Referring to FIG. 11, a server may obtain user account information identifying a user (step 1102). The server may receive the information from a computing device currently playing a media item, such as music. The server may determine whether a play history instance for the media item has been recorded. In response to determining that the play history instance for the media item has not previously been recorded, a play history instance for the media item may be recorded or added (step 1104). In response to determining that the play history instance for the media has been recorded, the play history instance may be updated in accordance with examples described herein. The method may also include marking the media item for a recommendation update if needed.

The method of FIG. 11 includes obtaining a list of other users currently consuming or playing the same media item (step 1106). For example, other computing devices may transmit to the server identification of the media item currently being played by the respective computing device. The server may determine the computing devices playing the same media item.

The method of FIG. 11 includes determining a number of playheads to fit on a position scrollbar and dividing the position scrollbar into intervals (step 1108). For example, the number of playheads to be identified is determined by determining the number of playhead icons that can fit on the time line of the scrollbar without touching, and subtracting one for the current user. If some white space is desired between the playheads, the number may be further reduced. The position scrollbar may then be divided into intervals. For each interval, other than the interval occupied by the current user, the optimal playhead is determined. The criteria for determining the optimal playhead may depend on one or more factors such as, but not limited to, a social distance, a social graph, subnet proximity, physical location proximity, group affiliations, media preference similarities, media collection similarities, physical location, heavy influencer status, and the like. The method of FIG. 11 also includes selecting playheads for each interval based on playhead score except for the interval containing the current user's playhead (step 1110). Further, the method of FIG. 11 includes assembling the list of playheads, corresponding positions, and corresponding media item schedules (step 1112). Further, the method includes obtaining future media items for a user, replacing the existing schedule with updated information in the media item schedule, and determining whether recommendations need to be refreshed (step 1114). The method of FIG. 11 also includes providing a list of playheads, corresponding positions, and corresponding media item schedules to the computing device (step 1116). For example, the server may provide this information to the computing device for processing and display on its display in accordance with examples described herein.

In one or more embodiments, a heavy influencer may be a user who has a greater number of followers than a number of users he or she is following. The strength of a heavy influencer may be expressed with equation 1, where L indicates the count of users being led, and F indicates the number of users being followed. This is set forth in the following equation:

$$I_{rating}(L, F) = \frac{F*(L+F)}{L+1} \qquad \text{Equation (1)}$$

In one or more embodiments, a friends list may be obtained externally through a social network site. The relationship with the friends may be a symmetrical reciprocal friendship, or it may be an asymmetrical follower/followee type relationship. The friends list may be stored on the user's computing device and/or remotely at a central system or one or more other computing devices.

As an example, Table 1 sets forth a number of factors that may be used in determining other users' playheads to display on a current song position scrollbar, such as 532 shown in FIG. 5. It is noted that due to display size constraint, users (all other users for example) other than those identified on the position scrollbar may be identified in any suitable manner. It may be beneficial to consider other users when selecting a next media item. In an embodiment of the present disclosure, the final selection of which other users to render on the position scrollbar may be delayed until a next media item to play is determined, because it may then be possible to make sure that the other user(s) contributing the next media item 255 to play will be included in the other users rendered on the current song position scrollbar 532.

Table 1 follows:

TABLE 1

Factors for Position Scrollbar Display

| Factor | Description |
| --- | --- |
| Profile | User selection score may be determined as a factor of the following factors: age, gender, birthday, demographic information, race, ethnicity, political affiliation, clubs, awards, and the like. |
| Last Appearance | User selection score may be weighted based on a number of times the other user has appeared over a time interval. This may prevent the same user(s) from showing up every time. |
| Location | User selection score may be weighted based on a location of the other user. For example, closer other users may be scored higher, further other users may be scored higher, or maximizing dispersion may be desired. |
| Proximity | User selection score may be weighted based on the proximity of the other user. Proximity may be determined by wireless connectivity in situations where location information may not be available. |
| Media Source | Only those other users that are self-determining their play selections may be considered for inclusion. For example, users listening to broadcast sources or algorithmically created playlists may not be included since they are not determining their upcoming media item selections. |
| Relative Playback Position | The user may prefer to favor users leading them, those trailing them, or to weight them equally. |
| User Preferences | User settable preferences may be applied to allow the user to specify the weights assigned to the above factors for determining a user selection score |

The other users and their corresponding playheads (e.g., playheads 520-1, 520-2, and 520-4 shown in FIG. 5) may be selected from the group of all users currently playing back the same media item. Based on the current popularity of the media item, the number of other users playing back the same media item may be zero, or may be very large. In a case in which the group of candidate other users is large, the group may be selected by assigning members of the group a score that is computed as a function of factors such as, but not limited to: social distance, profile matching, user proximity, playback position relative to user, and/or the like.

In an example, other users may be excluded from the display group if they are listening to a source of content where they do not control the next media items being played. Examples of this scenario may be when the user is listening to an algorithmically generated, or "hand constructed" constructed playlist. Other examples may be cases in which the user is receiving content from a stream or broadcast source, as again, they are not controlling the next media items being chosen for playback.

Figure 12:
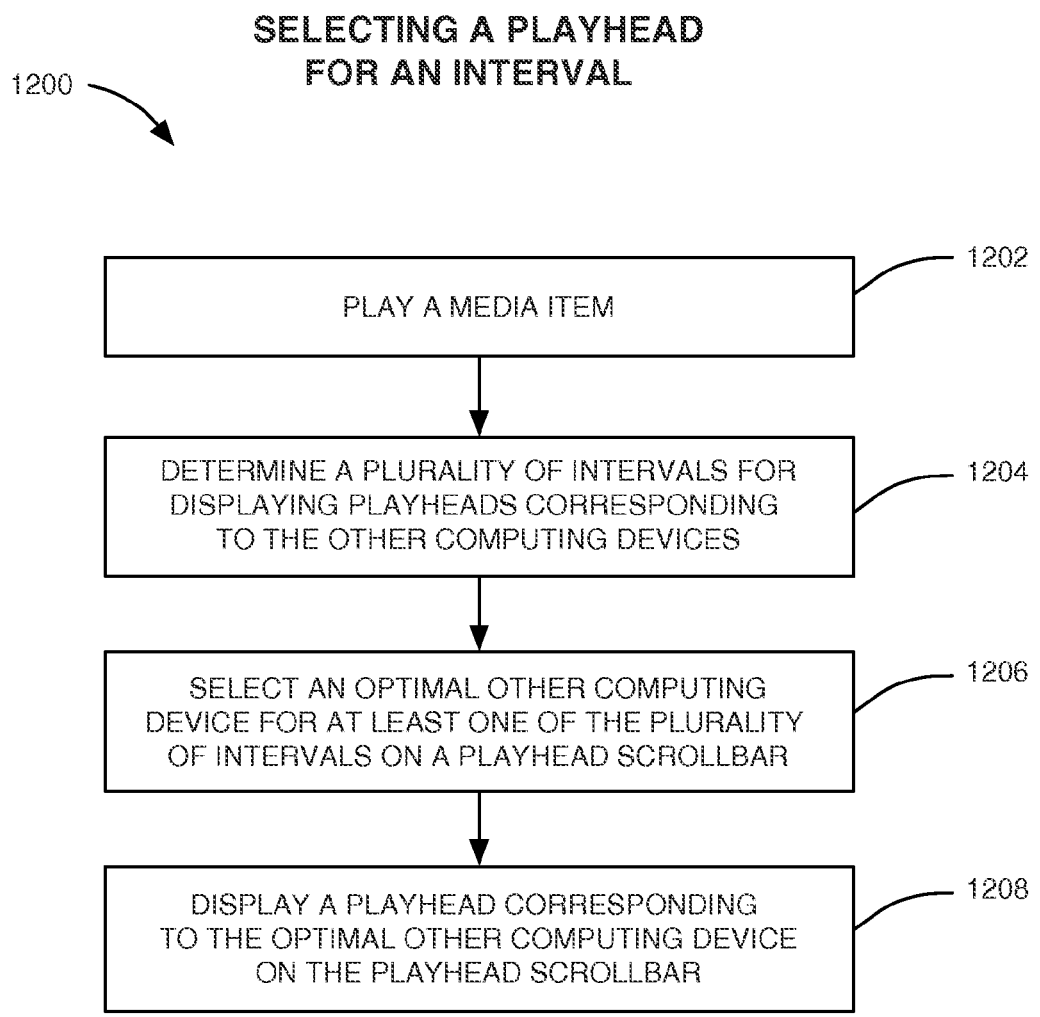
FIG. 12 is a flowchart of an example method of selecting a playhead for an interval in accordance with embodiments of the present disclosure.

FIG. 12 illustrates a flowchart of an example method 1200 of determining a playhead for an interval of a scrollbar in accordance with embodiments of the present disclosure. The method may be implemented by any suitable computing devices, such as the computing devices described herein. A processor and memory may be used for implementing the steps of the method 1200. Referring to FIG. 12, the method includes playing a media item (step 1202). For example, the computing device 50-1 shown in FIG. 1 may play music or another media item.

The method of FIG. 12 further includes determining a plurality of intervals for displaying playheads corresponding to other computing devices currently playing the same media item (step 1204). Continuing the aforementioned example, the computing device 50-1 may query the central system 100 for information about other computing devices playing the same media item. The central system 100 may determine the computing devices playing the same media item in accordance with examples disclosed herein. Further, the central system 100 may transmit identifiers of the computing devices to the computing device 50-1.

As an example, the other computing devices may be playing the media item at a point behind or ahead of the computing device 50-1. Further, the other computing devices may be selected based on locations of the other computing devices, proximity of the other computing devices to the computing device 50-1, a social distance between a user of the computing device 50-1 and users of the other computing devices, a match of user profiles between a user of the computing device 50-1 and users of the other computing devices, the like, and combinations thereof.

The method of FIG. 12 further includes selecting an optimal other computing device for at least one of the plurality of intervals (step 1206). For example, for each interval other than the interval occupied by the current user, the optimal playhead is determined. The criteria for determining the optimal playhead may depend on one or more factors such as, but not limited to, a social distance, a social graph, subnet proximity, physical location proximity, group affiliations, media preference similarities, media collection similarities, physical location, heavy influencer status, the like, or combinations thereof.

The method of FIG. 12 further includes displaying a playhead corresponding to the optimal other user on the playhead scrollbar (step 1208). As an example, other playheads may also be displayed on a scrollbar in accordance with examples disclosed herein. A position of each playhead may indicate a play state of the media item on a respective computing device. Further, each playhead may indicate a location of a respective computing device, a proximity of a respective computing device, a social distance of a respective computing device, the like, or combinations thereof.

Figure 13:
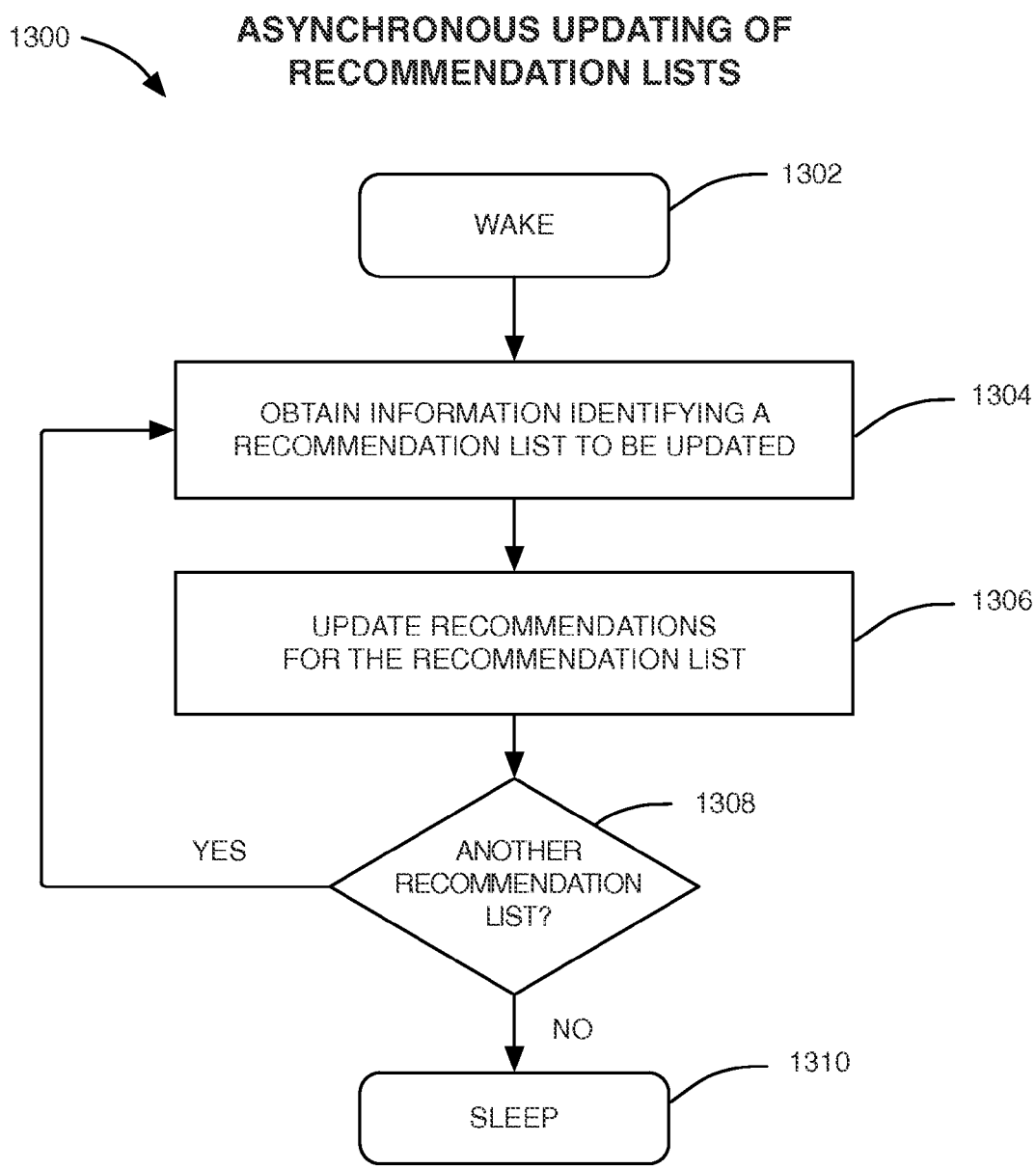
FIG. 13 is a flowchart of an example method of executing a thread to update all pending recommendations in accordance with embodiments of the present disclosure.

FIG. 13 illustrates a flowchart of an example method 1300 of executing a thread to update all pending recommendations in accordance with embodiments of the present disclosure. Any suitable computing device, such as one of the computing devices disclosed herein, may implement the example method. Referring to FIG. 13, execution may begin with the thread waking (step 1302). In an example, the thread may wake as a result of a media item being added to a job queue. Subsequently, a job may be obtained from the queue (step 1304). In an example, the job may be a reference to a tracker item (such as tracker item 410 shown in FIG. 4A) that requires recommendation updates. Subsequently, recommendations for the media item may be updated (step 1306). For example, the tracker item may be handled as described in the examples provided herein.

At step 1308, the method includes determining whether another job is in the queue. In response to determining that another job is in the queue, the method proceeds to step 1304 to obtain the next job, and to process the job in step 1306. In response to determining that another job is not in the queue, the method includes putting the thread to sleep (step 1310) until another job is added and the thread is again woken at step 1302.

Figure 14:
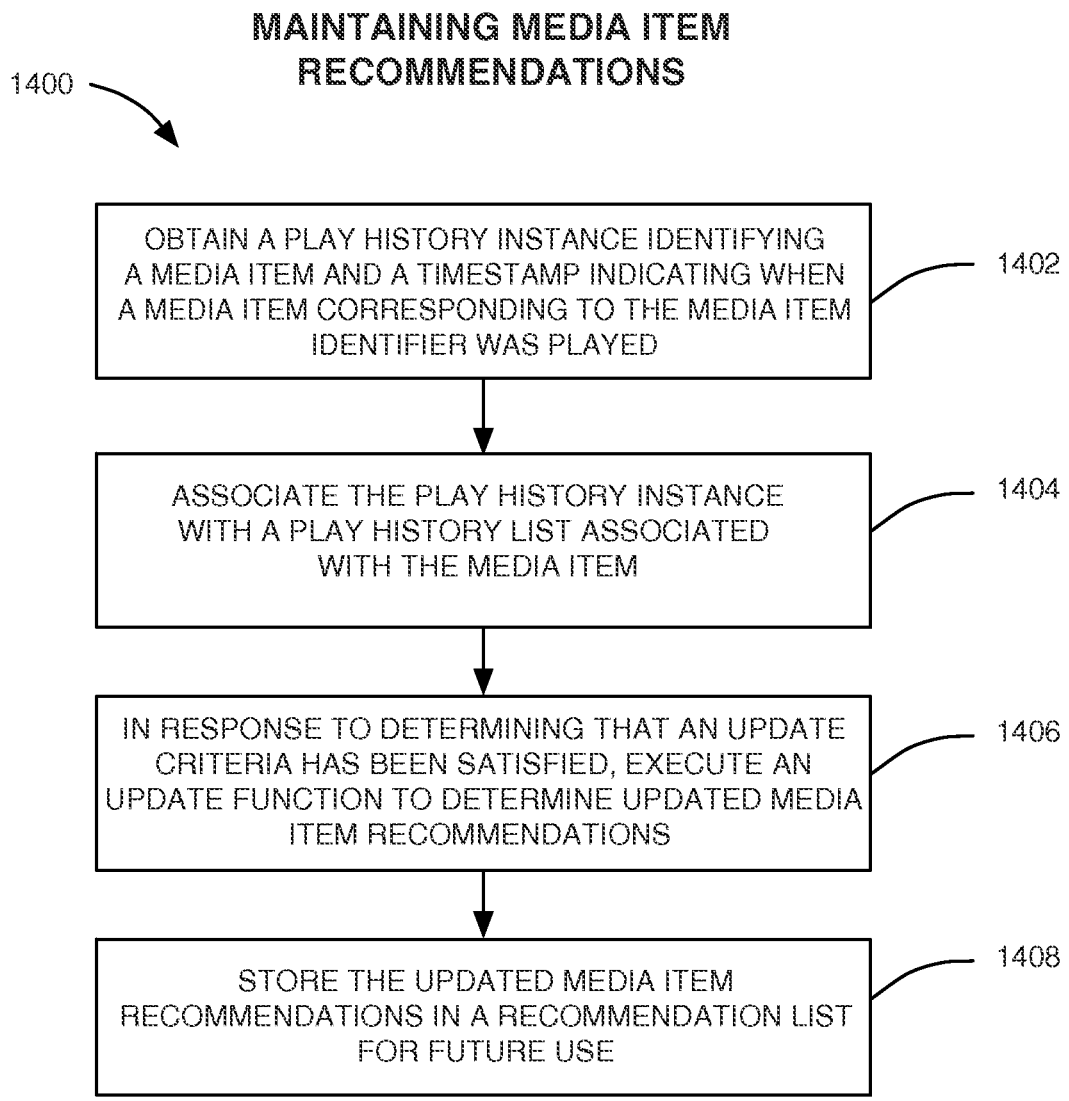
FIG. 14 is a flowchart of an example method of maintaining a list of media item recommendations in accordance with embodiments of the present disclosure.

FIG. 14 illustrates a flowchart of an example method 1400 of maintaining a list of media item recommendations in accordance with embodiments of the present disclosure. Any suitable computing devices, such as the computing devices described herein, may implement the method. A processor and memory may be used for implementing the steps of the method 1400. The media item recommendations may indicate candidate media items.

Referring to FIG. 14, the method includes obtaining a play history instance comprising a media item identifier and a timestamp that indicates when a media item corresponding to the media item identifier was played (step 1402). For example, the central system 100 may receive information from computing devices 50-1, 50-2, and 50-3 that indicates media items that are currently playing or have been played. Further, the central server 100 may receive information from computing devices 50-1, 50-2, and 50-3 that indicate timestamp information such as when media items were played.

The method of FIG. 14 further includes associating the play history instance to an existing play history list for the media item corresponding to the media item identifier (step 1404).

The method of FIG. 14 further includes updating the list of media item recommendations by executing an evaluation function 463 in response to determining that an evaluation criteria 461 has be satisfied (step 1406). In one embodiment, the evaluation criteria 461 is satisfied by comparing the last evaluation 462 time to the play history instance timestamp and determining that a time difference between the timestamp and the last evaluation time meets a threshold.

The method of FIG. 14 includes storing media item recommendations for future use (step 1408). The media item recommendations may also be used immediately to determine the next media item to play in response to a request. A computing device, such as computing device 50-1, may receive the media item recommendations, and may play back one or more media items corresponding to media item identifier(s) contained in the media item recommendations.

Figure 15:
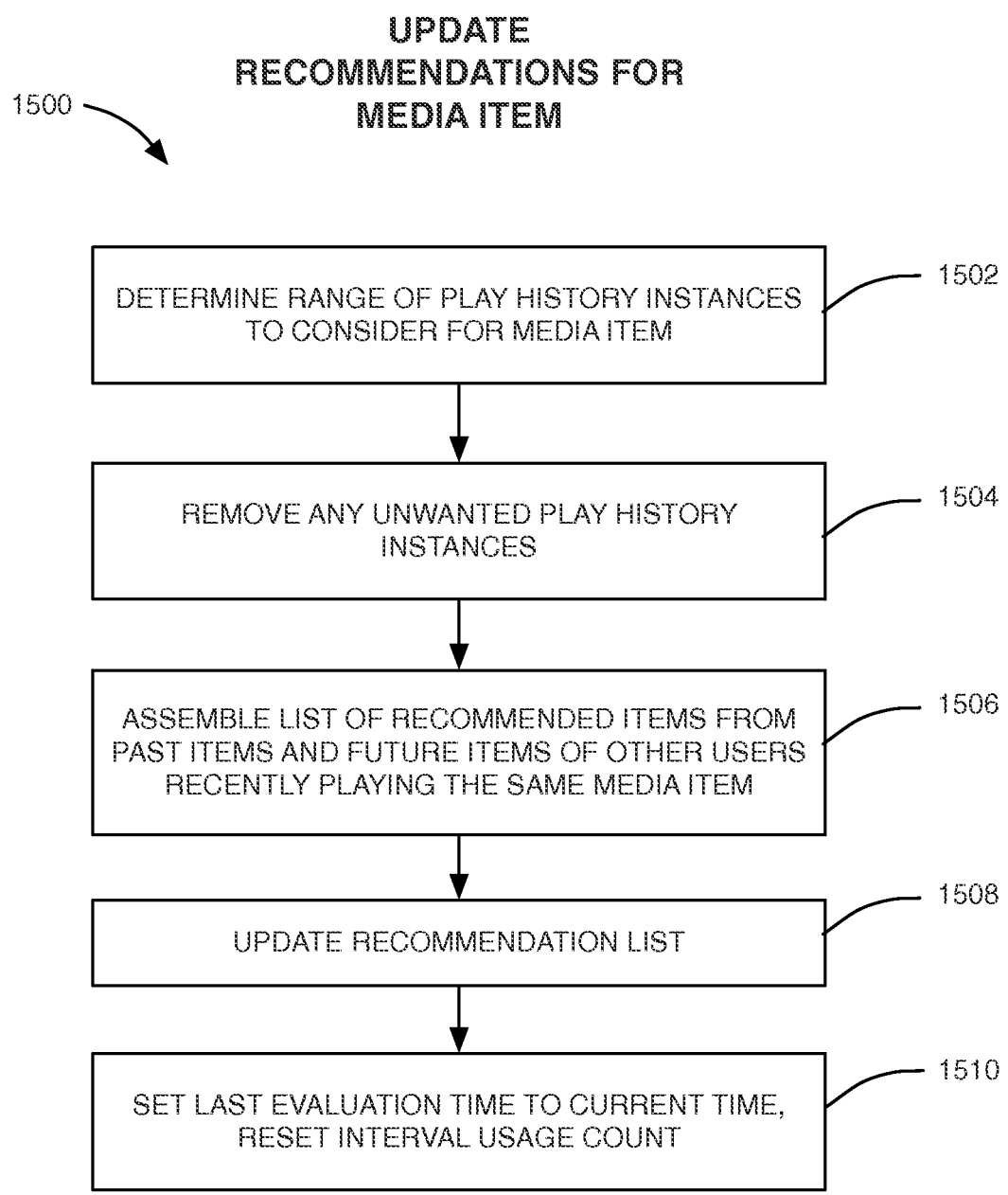
FIG. 15 is a flowchart of an example method of updating recommendations for a media item in accordance with embodiments of the present disclosure.

FIG. 15 illustrates a flowchart of an example method 1500 of updating recommendations for a media item in accordance with embodiments of the present disclosure. Any suitable computing device, such as one of the computing devices disclosed herein, may implement the example method. Referring to FIG. 15, the method includes determining a range of play history instances to consider for a media item (step 1502). For example, referring to FIG. 4B, the range of play history instances 450 to consider may be determined. In another example, the play histories considered are all of the play history instances accumulated since the last update of recommendations. In another example, the number of play history instances considered is a fixed number. The play history instances considered may come entirely from newly accumulated play history instances or they may be a combination of new play history instances and previously considered play history instances.

The method of FIG. 15 further includes removing any unwanted play history instances (step 1504). The play history instances may be removed for any suitable reason. In an example, all play history instances contributed by users outside a geographic region may be removed from consideration.

The method of FIG. 15 further includes assembling a list of recommended media items from past media items and future media items of other users recently playing the same media item (step 1506). A list of recommended media items may be assembled from past and future media items of other users recently playing the same media item. The recommendations may be sorted, and the top scoring media item recommendations may be stored in the recommendation list for updating the recommendation list (step 1508). Subsequently, the last evaluation time is set to the current time and the reset interval usage count is reset (step 1510).

Table 2 shows various factors that may be used for determining a media item selection score.

| Factor | Description |
| --- | --- |
| Item Availability | Media item selection score may be set to zero for media items not available for playback by the user. |
| Item Occurrence | Media item selection score may be weighted based on the number of times the media item has been played over a time interval. This prevents the same media items from playing every time. |
| User Preferences | Preferences may be used to allow the user to specify the weights assigned to the above factors for determining a media item selection score. |

Figure 16:
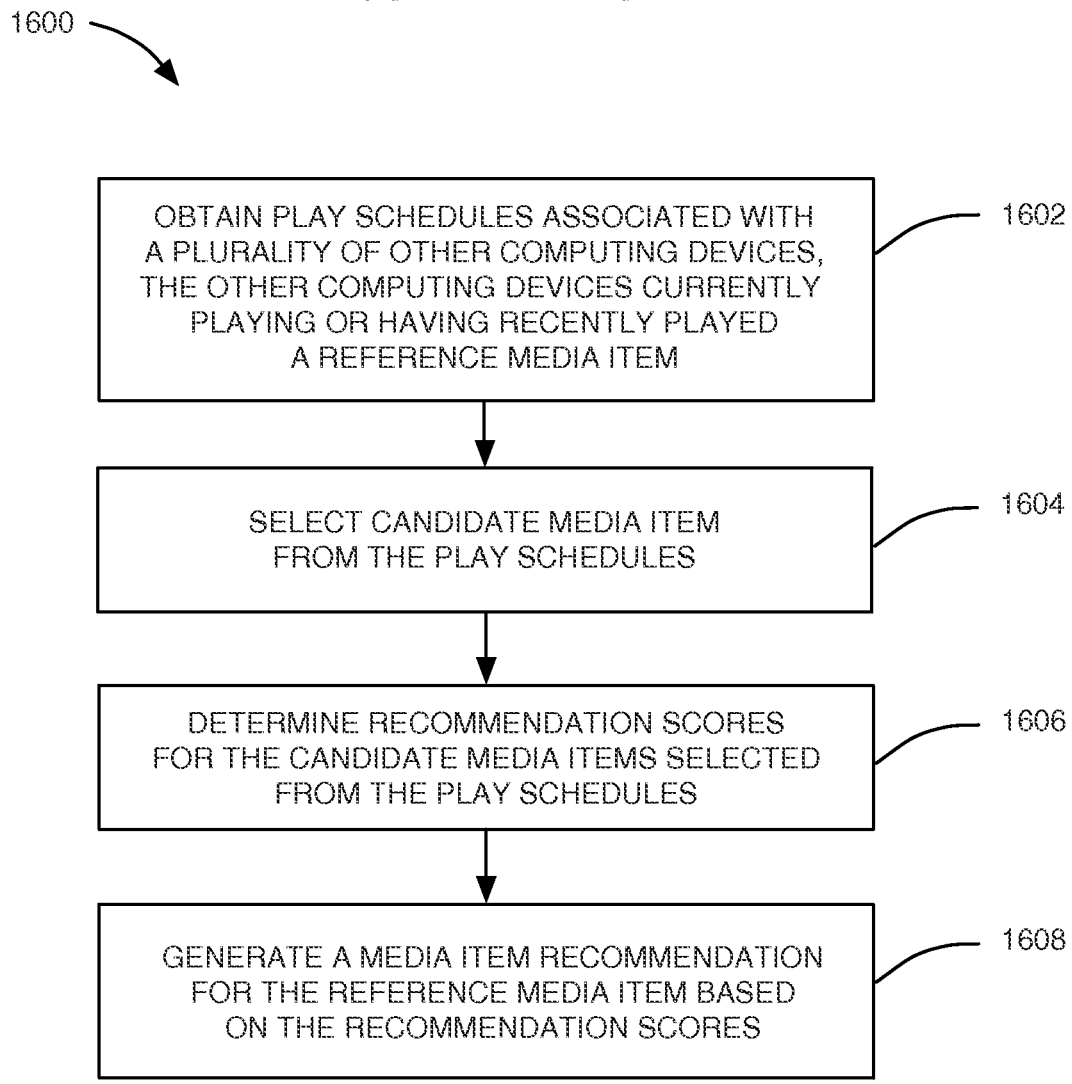
FIG. 16 is a flowchart of an example method of generating a media item recommendation in accordance with embodiments of the present disclosure.

FIG. 16 illustrates a flowchart of an example method 1600 of generating media item recommendations in accordance with embodiments of the present disclosure. Any suitable computing devices, such as the computing devices described herein, may implement the method. A processor and memory may be used for implementing the steps of the method 1600.

Referring to FIG. 16, the method includes obtaining play schedules associated with a plurality of other computing devices, the other computing devices currently playing or having recently played a reference media item (step 1602). For example, referring to FIG. 1, the computing device 50-1 may receive play schedules from the central system 100. In an example, the computing device 50-1 may transmit to the central system 100 an identifier of a media item that it is currently playing. In response to receipt of the media item identifier, the central system 100 may determine other computing devices (e.g., computing devices 50-2 and 50-3) that are playing or have recently played the same media item as computing device 50-1. In an example, the candidate media items may be selected from among media items previously played by the other computing device(s). In another example, the candidate media items may be selected from among media items currently being played or scheduled for play by the other computing device(s) (step 1604). As an example, identifiers of the candidate media items may be transmitted to the central system 100 by the other computing devices 50-2 and 50-3.

In one embodiment of the present disclosure, the candidate media items are chosen from the play schedules based on their occurring within an analysis window. The analysis window may be expressed in terms of media items or in units of time. The term "recently played media item" may refer to a media item that has been played within a predetermined time period of a current time. In another example, the term "recently played" may correspond to the media item being played within a predetermined number of previously played media items.

In accordance with embodiments of the present disclosure, the play schedules(s) may be selected based on an affinity between the user of the corresponding computing device 50-1 and users of other computing devices, such as computing devices 50-2 and 50-3. For example, the computing devices may be selected based on one or more of an influence rating, a last appearance, a location, proximity, a media source, a relative playback position, and the like.

The method of FIG. 16 further includes determining recommendation scores for the candidate media item based on occurrence counts of the media items within a predetermined time period (step 1606). For example, a computing device or server may count the number of occurrences (e.g., number of times the candidate music was played) within a predetermined time period. The recommendation score may be based on the occurrence count for the others within the predetermined time period.

The method of FIG. 16 further includes generating a media item recommendation for the other computing device based on the recommendation scores (step 1608). For example, the computing device or server may select one or more media item recommendations from the media items based on the recommendation score. For example, the computing device or server may present a media item recommendation indicating the media item with the highest number of occurrences within a predetermined analysis window.

The method of FIG. 16 may optionally include playing the media item associated with the media item recommendation. For example, the computing device 50-1 may play back the media item indicated by the media item recommendation in response to receipt of the media item recommendation. In another example, the computing device 50-1 may place an identifier of the media item on a playback list for subsequent playback.

Figure 17:
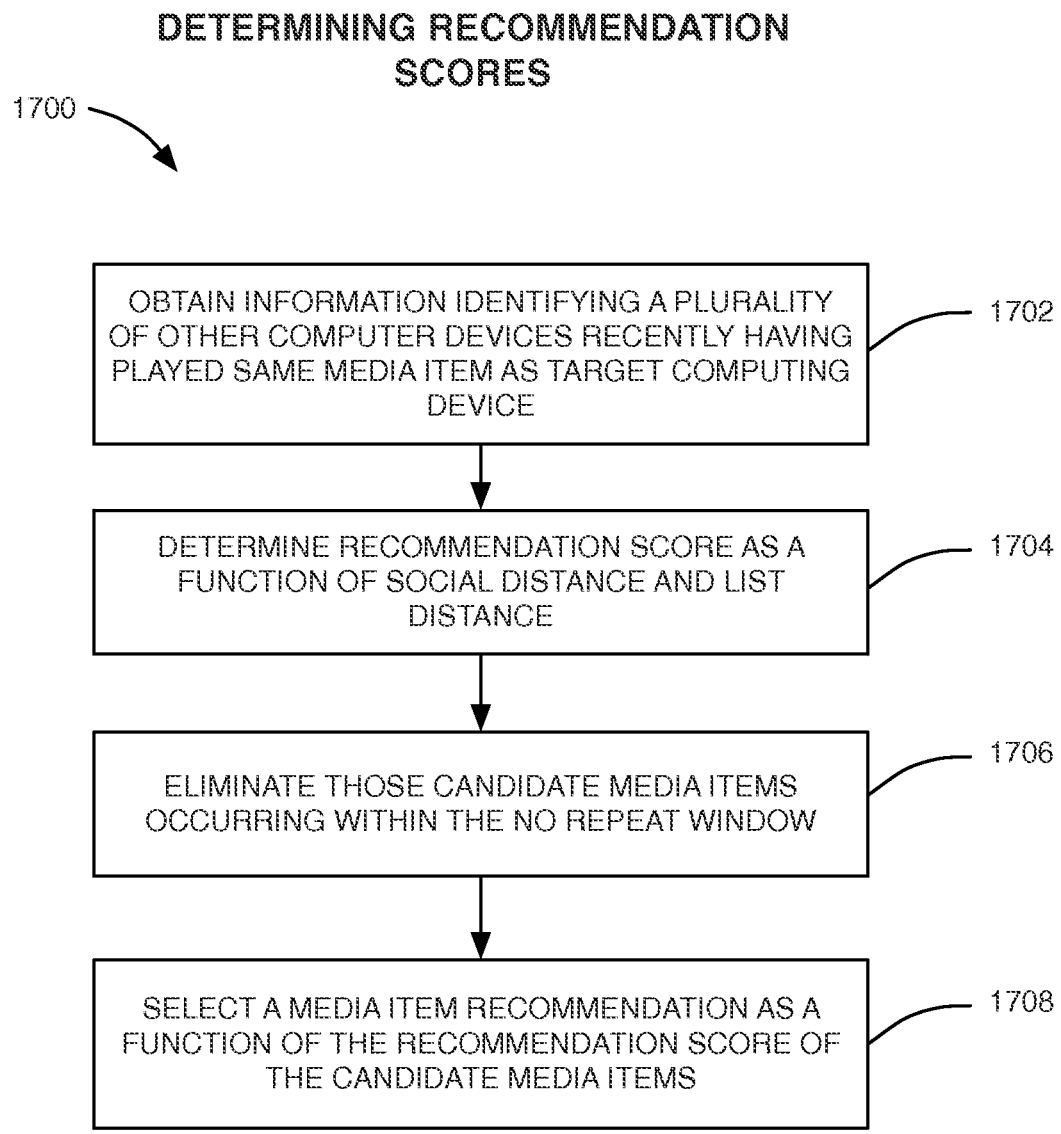
FIG. 17 is a flowchart of an example method of determining recommendation scores in accordance with embodiments of the present disclosure.

FIG. 17 illustrates a flowchart of an example method 1700 of determining recommendation scores for media items in accordance with embodiments of the present disclosure. Any suitable computing devices, such as the computing devices described herein, may implement the method. A processor and memory may be used for implementing the steps of the method 1700.

Referring to FIG. 17, the method includes obtaining information identifying a plurality of other computing devices recently having played the same media item as a target computing device (step 1702).

The method of FIG. 17 further includes determining a recommendation score as a function of social distance and list distance (step 1704). In one implementation of the present disclosure, the formula shown in Equation 2 is used to compute the recommendation score (such as the final score 1814 shown in FIGS. 18A and 18B). The social distance SD 1808 (shown in FIGS. 18A and 18B for example) is the number of hops between friends in a social graph. For example the social distance between friends is one. For a friend of a friend, the social distance is two. The list distance LS 1806 is the distance between the recently played media item and the candidate media item being scored. In the example calculation of FIGS. 18A and 18B, the candidate media items 1802 are labeled media item A-X. The recently played media item 1818 is media item G.

$$R_{score}(S_D, L_D) = \sum_{i=0}^{N_{CMI}-1} \frac{1}{S_D(i) * L_D(i)} \qquad \text{Equation (2)}$$

Returning to FIG. 17, the method further includes eliminating candidate media items occurring within the no repeat window (step 1706). To prevent the same song from being repeated too often, a no repeat factor 1810 is included in the computation of the recommendation score. In one implementation of the present disclosure, the no repeat factor is accounted for by removing a media item played during a no repeat window 605 (shown in FIG. 6B). In the example of FIGS. 18A and 18B, the media items occurring within the no repeat window are media items D, F, J, M, O, R.

The method of FIG. 17 further includes selecting as a recommendation the candidate media item as a function of the recommendation score of the candidate media items (step 1708). FIGS. 18A and 18B set forth exemplary computation of recommendation scores according to embodiments of the present disclosure, Media item 1802 indicates the candidate media items being scored. Contributor 1804 indicates the user of the computing device from which the respective candidate media item was obtained from a play schedule. List distance 1806 indicates the number of media items between the respective candidate media item and the reference media item 1818 in the play schedule for the corresponding contributing user. Social distance 1808 indicates the respective social graph distance between the user contributing the candidate media item and the reference media item 1818. No repeat 1810 indicates if the candidate media item should be removed from consideration because it has been recently played by the user receiving the media recommendations. In this case, the receiving user has recently played media items "O", "F", "M", "D", "J", "R" so they are removed from consideration 1816. Sub score 1812 indicates the respective score contribution for each play instance occurrence considered in the computation, Final score 1814 indicates the total recommendation score for the respective candidate media item. The highest scoring candidate media item 1820 is media item "H" having a recommendation score of 1.58.

The example systems, methods, and computing devices disclosed herein are described as being applied to media content such as video and music, although it should be understood that these systems, methods, and computing devices disclosed herein may be similarly applied to other media content. For example, the media content may be an electronic book (often referred to as an "e-book"). Progress of a reader of e-books on multiple computing devices may be determined as described herein and this information used among the computing devices in accordance with embodiments disclosed herein.

In accordance with embodiments, a server, such as a web server, may be accessed by a suitably-configured computing device for presenting media content. For example, a web server may be accessed for playing music. In this example, the music can be streamed to the computing device, rather than being stored on the computing device until played by the computing device. In this case, the methods and systems disclosed herein may be implemented at the web server. Instructions for the display of playback indicia, such as a play scrollbar and playheads, can be determined at the web server, and subsequently communicated to the computing device for presentation to the user.

Figure 19:
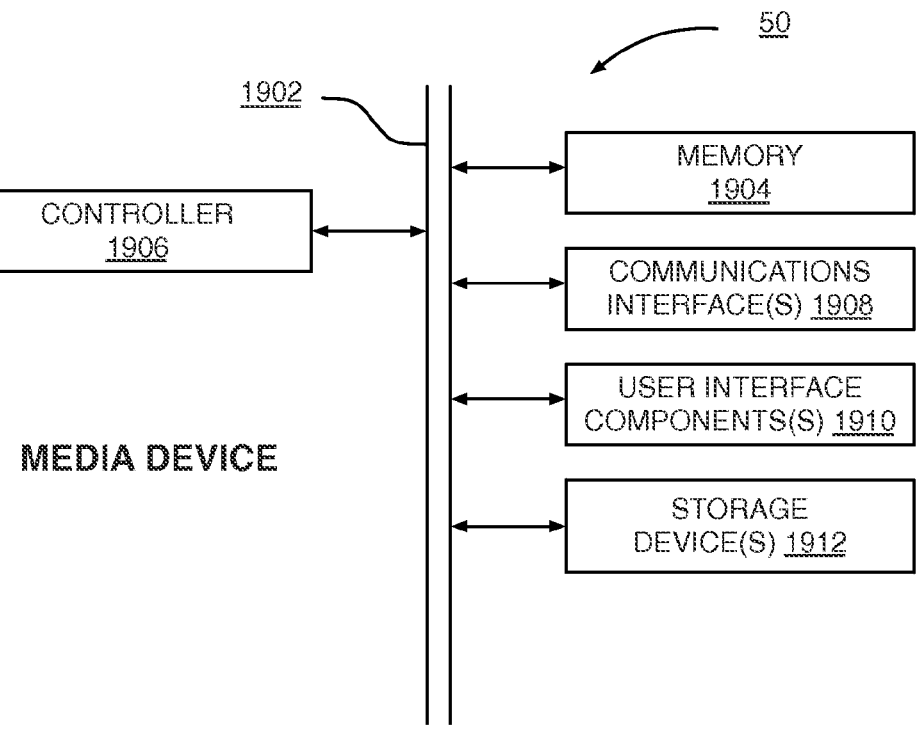
FIG. 19 is a block diagram of a computing device in accordance with embodiments of the present disclosure.

FIG. 19 illustrates a block diagram of a computing device 50 in accordance with embodiments of the present disclosure. Referring to FIG. 19, the computing device 50 includes a controller 1906 communicatively connected to memory 1904, one or more communications interfaces 1908, one or more user interface components 1910, and one or more storage devices 1912 by a bus 1902 or similar mechanism. The controller 1906 may be, for example a microprocessor, digital ASIC, FPGA, or the like. In an example, the controller 1906 may be a microprocessor. The controller 1906 may be implemented in software and stored in the memory 1904 for execution by the controller 1906. The communications interface(s) 1908 is a wireless communication interface that may communicatively connect the computing device 50 to a network. For example, the communications interface 1908 may be a local wireless interface such as a wireless interface operating according to one of the suite of IEEE 802.11 standards, BLUETOOTH®, or the like. The user interface component(s) 1910 may include, for example, a touchscreen, a display, one or more user input components (e.g., a keypad), a speaker, or the like, or any combination thereof. The storage device(s) 1912 may be a non-volatile memory.

Figure 20:
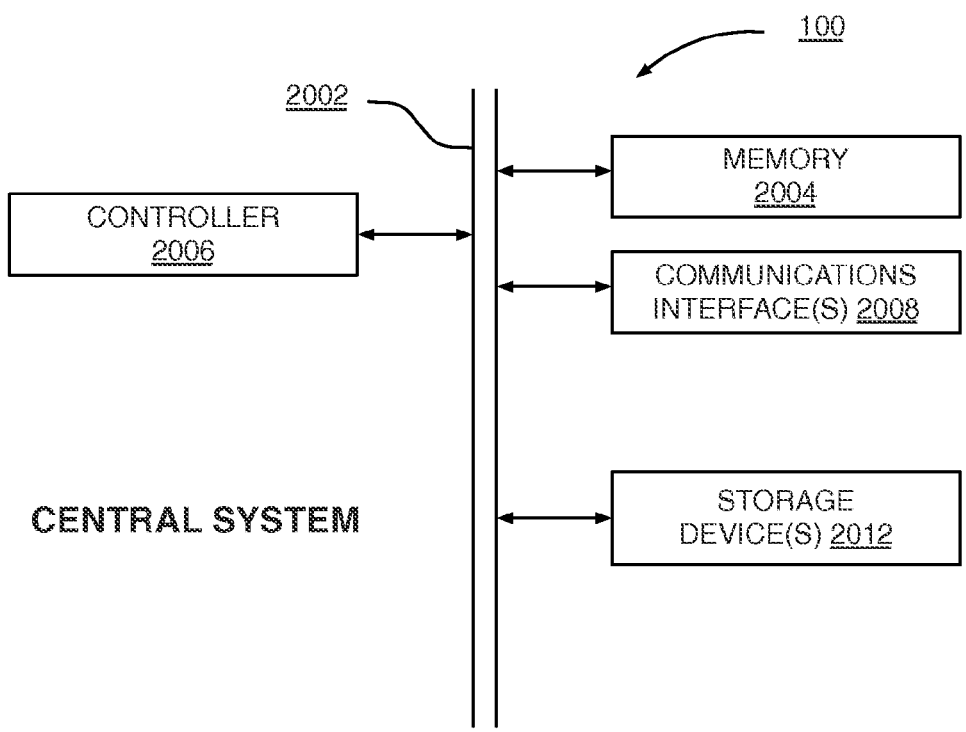
FIG. 20 is a block diagram of a central system in accordance with embodiments of the present disclosure.

FIG. 20 illustrates a block diagram of a central system 100 of FIG. 1 in accordance with embodiments of the present disclosure. Referring to FIG. 20, the central system 100 includes a controller 2006 communicatively connected to a memory 2004, one or more secondary storage devices 2012, and one or more communications interface(s) 2008 by a bus 2002 or similar mechanism. The controller 2006 may be, for example, a microprocessor, digital ASIC, Field Programmable Gate Array FPGA, or the like. In an example, the controller 2006 is a microprocessor, and the control system 102 is implemented in software and stored in the memory 2004 for execution by the controller 2006. Further, user accounts and tracker information may be stored in the secondary storage device(s) 2012. The secondary storage devices 2012 may be digital data storage devices such as, for example, one or more hard disk drives. The communications interface(s) 2008 may be wired or wireless communication interfaces that communicatively couple the central system 100 to the network, such as the network shown in FIG. 1. For example, the communications interface(s) 2008 may be Ethernet interfaces, local wireless interfaces such as wireless interfaces operating according to one of the suite of IEEE 802.11 standards, or the like.

Those skilled in the art will recognize improvements and modifications to the embodiments of the present disclosure. All such improvements and modifications are considered within the scope of the concepts disclosed herein and the claims that follow.

The proposed system overcomes deficiencies of existing systems by making use of real time play history data provided by a number of users experiencing media items on an ongoing basis. By counting co-occurrences of media items within user play schedules, the present system is able to quickly adapt to changes in polarity of new media items. Also, since each play history instance includes geographic location information and a timestamp, recommendations may be tailored to a specific location, or to a specific time period in history. For example, the play history instance may include information about the affinity between two songs in L.A. In 1981. Additionally, since play histories are maintained per media item, it is possible to re-compute recommendation information for more popular media items on a more frequent schedule. For example, if a certain song is only played twice in a day, and another new song is played 200K times in a day, more computational resources should be applied to the more frequently played song.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs may be implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method of updating a list of media item recommendations for a single media item of a plurality of media items, the method comprising:
    using at least a hardware processor and memory for:
        obtaining a play history instance for the single media item comprising a media item identifier, a timestamp indicating a time when a media item corresponding to the media item identifier was played, a user identifier identifying a user having played the single media item, and location information identifying a geographic location at which the user played the media item;
        adding the play history instance for the single media item to a play history list for the single media item corresponding to the media item identifier;
        in response to determining that an update criteria has been satisfied, executing an update function thereby updating the list of media item recommendations;
        determining whether a removal criteria has been satisfied; and
        in response to determining that the removal criteria has been satisfied, executing a removal function, thereby removing a play history instance from the play history list, wherein the removal criteria is determined as a function of an online status history of a user in the play history instance, wherein the user and other users of the list of media item recommendations participate in a social network, the online status history indicating a plurality of times in the past when the user was logged in to and participating in the social network.

2. The method of claim 1, wherein the update criteria is determined as a function of elapsed time since a last update was performed.

3. The method of claim 1, wherein the update criteria is determined as a function of a numerical count of play history instances received since a last update was performed.

4. The method of claim 1, wherein the update criteria is determined as a function of a number of media item recommendation requests since a last update was performed.

5. The method of claim 1, wherein the update criteria is determined as a function of a number of times the media item has been played since a last update was performed.

6. The method of claim 1, further comprising determining the media item recommendations based on recommendation scores for the media items in the play history.

7. The method of claim 6, wherein the recommendation scores are determined as a function of one or more of: time of play of a media item, media content blocking information, evaluation time, usage count, and a number of times media content has been accessed.

8. The method of claim 1, wherein the removal criteria is further determined as a function of a total number of play instance histories in the play history list.

9. The method of claim 1, wherein the removal criteria is further determined as a function of a geographic location of a user in the play history instance.

10. The method of claim 1, wherein the media item includes one of audio, video, and text.

11. The method of claim 1, wherein the media item recommendations indicate candidate media items.

12. The method of claim 1, wherein the play history instance is obtained based on a percentage of the media item having been consumed.

13. The method of claim 1, wherein the play history instance is obtained based on a percentage of the media item having yet to be consumed.

14. The method of claim 1, wherein the play history instance is obtained based on a time duration of the media item having been consumed.

15. The method of claim 1, wherein the play history instance is obtained based on a time duration of the media item having yet to be consumed.

16. The method of claim 1, further comprising:
    receiving the media item recommendations; and
    playing back the media item corresponding to the media item identifier.

17. The method of claim 1, further comprising providing the media item recommendations to a computing device.

18. A method of updating a list of media item recommendations for a single media item of a plurality of media items, the method comprising:
    using at least a hardware processor and memory for:
        obtaining a play history instance for the single media item comprising a media item identifier, a timestamp indicating a time when a media item corresponding to the media item identifier was played, a user identifier identifying a user having played the single media item, and location information identifying a geographic location at which the user played the media item;
        adding the play history instance for the single media item to a play history list for the single media item corresponding to the media item identifier;
        in response to determining that an update criteria has been satisfied, executing an update function thereby updating the list of media item recommendations;
        determining whether a removal criteria has been satisfied; and
        in response to determining that the removal criteria has been satisfied, executing a removal function, thereby removing a play history instance from the play history list, wherein the removal criteria is determined as a function of an influence rating of a user in the play history instance, wherein the user and other users of the list of media item recommendations participate in a social network capable of storing information identifying asymmetrical friend relationships, the influence rating of the user being determined as a function of a numerical count of other users that the user is following and a numerical count of other following users that are following the user.

19. A method of updating a list of media item recommendations for a single media item of a plurality of media items, the method comprising:
using at least a hardware processor and memory for:
obtaining a play history instance for the single media item comprising a media item identifier, a timestamp indicating a time when a media item corresponding to the media item identifier was played, a user identifier identifying a user having played the single media item, and location information identifying a geographic location at which the user played the media item;
adding the play history instance for the single media item to a play history list for the single media item corresponding to the media item identifier;
in response to determining that an update criteria has been satisfied, executing an update function thereby updating the list of media item recommendations;
determining whether a removal criteria has been satisfied; and
in response to determining that the removal criteria has been satisfied, executing a removal function, thereby removing a play history instance from the play history list, wherein the removal criteria is determined as a function of a friend count of a user in the play history instance, wherein the user and other users of the list of media item recommendations participate in a social network capable of storing information identifying symmetrical friend relationships, the friend count identifying a numerical count of other users identified as friends of the user.

20. A server comprising:
a communications interface configured to facilitate communication with a plurality of computing devices; and
a hardware processor coupled to the communications interface and configured to:
obtain from a computing device a play history instance for a single media item of a plurality of media items, the play history instance comprising a media item identifier, a timestamp indicating a time when a media item corresponding to the media item identifier was played, a user identifier identifying a user having played the single media item, and location information identifying a geographic location at which the user played the media item;
add the play history instance for the single media item to a play history list for the single media item corresponding to the media item identifier;
in response to determining that the update criteria has been satisfied, executing an update function to thereby update the list of media item recommendations;
determining whether a removal criteria has been satisfied; and
in response to determining that the removal criteria has been satisfied, executing a removal function, thereby removing a play history instance from the play history list, wherein the removal criteria is determined as a function of an online status history of a user in the play history instance, wherein the user and other users of the list of media item recommendations participate in a social network, the online status history indicating a plurality of times in the past when the user was logged in to and participating in the social network.

21. A computer program product comprising:
a non-transitory computer readable storage medium having computer readable program code embodied therein, the computer readable program code comprising:
computer readable program code configured to obtain from a computing device a play history instance for a single media item of a plurality of media items, the play history instance comprising a media item identifier, a timestamp indicating a time when a media item corresponding to the media item identifier was played, a user identifier identifying a user having played the single media item, and location information identifying a geographic location at which the user played the media item;
computer readable program code configured to add the play history instance for the single media item to a play history list for the single media item corresponding to the media item identifier;
computer readable program code configured to enable execution of an update function to thereby update the list of media item recommendations in response to determining that an update criteria has been satisfied
computer readable program code configured to determine whether a removal criteria has been satisfied; and
computer readable program code configured to, in response to determining that the removal criteria has been satisfied, executing a removal function, thereby removing a play history instance from the play history list, wherein the removal criteria is determined as a function of an online status history of a user in the play history instance, wherein the user and other users of the list of media item recommendations participate in a social network, the online status history indicating a plurality of times in the past when the user was logged in to and participating in the social network.

* * * * *